(12) United States Patent
Platt et al.

(10) Patent No.: US 6,993,532 B1
(45) Date of Patent: Jan. 31, 2006

(54) AUTO PLAYLIST GENERATOR

(75) Inventors: John C. Platt, Bellevue, WA (US); Christopher Burges, Bellevue, WA (US); Alice Zheng, Fremont, CA (US); Christopher B. Weare, Bellevue, WA (US); Steven E. Swnson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 840 days.

(21) Appl. No.: 09/870,292

(22) Filed: May 30, 2001

(51) Int. Cl.
*G06F 17/30* (2006.01)

(52) U.S. Cl. .............................. 707/102; 707/2; 707/3; 707/10; 707/200; 84/609

(58) Field of Classification Search .................... 707/2, 707/3, 10, 102, 200, 104.1; 706/12; 715/532; 84/609
See application file for complete search history.

(56) References Cited

U.S. PATENT DOCUMENTS

| | | | |
|---|---|---|---|
| 4,843,562 | A | 6/1989 | Kenyon et al. |
| 5,210,820 | A | 5/1993 | Kenyon |
| 5,428,732 | A | 6/1995 | Hancock et al. ............ 395/154 |
| 5,616,876 | A | 4/1997 | Cluts |
| 5,619,709 | A * | 4/1997 | Caid et al. ................... 715/532 |
| 6,026,439 | A | 2/2000 | Chowdhury et al. ........ 709/223 |
| 6,049,777 | A | 4/2000 | Sheena et al. |
| 6,061,680 | A | 5/2000 | Scherf |
| 6,085,226 | A | 7/2000 | Horvitz |
| 6,154,773 | A | 11/2000 | Roberts et al. |
| 6,195,622 | B1 | 2/2001 | Altschuler et al. |
| 6,230,207 | B1 | 5/2001 | Roberts et al. |
| 6,289,353 | B1 * | 9/2001 | Hazlehurst et al. ......... 707/102 |
| 6,370,526 | B1 | 4/2002 | Agrawal et al. |
| 6,516,308 | B1 * | 2/2003 | Cohen ......................... 706/12 |
| 6,523,026 | B1 * | 2/2003 | Gillis ............................ 707/3 |
| 6,526,411 | B1 * | 2/2003 | Ward .......................... 707/102 |
| 6,605,770 | B2 * | 8/2003 | Yamane et al. ............... 84/609 |
| 6,658,423 | B1 * | 12/2003 | Pugh et al. ................. 707/102 |
| 6,766,316 | B2 * | 7/2004 | Caudill et al. ................. 707/3 |
| 2003/0028796 | A1 | 2/2003 | Roberts et al. |
| 2003/0086341 | A1 | 5/2003 | Wells et al. |
| 2003/0095660 | A1 | 5/2003 | Lee et al. |

FOREIGN PATENT DOCUMENTS

EP  0 480 010 B1  9/1996

(Continued)

OTHER PUBLICATIONS

A. Mufit Ferman, James E. Errico, Peter Van Beek, and M. Ibrahim Sezan. Content-based Filtering and.

(Continued)

*Primary Examiner*—Shahid Alam
(74) *Attorney, Agent, or Firm*—Amin & Turocy, LLP

(57) ABSTRACT

A system and method for generating a list is provided. The system includes a seed item input subsystem, an item identifying subsystem, a descriptive metadata similarity determining subsystem and a list generating subsystem that builds a list based, at least in part, on similarity processing performed on seed item descriptive metadata and user item descriptive metadata and user selected thresholds applied to such similarity processing. The method includes inexact matching between identifying metadata associated with new user items and identifying metadata stored in a reference metadata database. The method further includes subjecting candidate user items to similarity processing, where the degree to which the candidate user items are similar to the seed item is determined, and placing user items in a list of items based on user selected preferences for (dis)similarity between items in the list and the seed item.

16 Claims, 18 Drawing Sheets

FOREIGN PATENT DOCUMENTS

JP        EP 1244033 A2 * 9/2002
JP        EP 1283487 A2 * 2/2003

OTHER PUBLICATIONS

E. Wold, T. Blum, D. Keislar, and J. Wheaten. Content-based Classification, Searching, and Retrieva.

Andreas Paepcke, Hector Garcia-Molina, Gerard Rodriguez-Mula, and Junghoo Cho. Beyond Document Simi.

"MSN Music Uses 'Sounds Like' Technology to Give Listeners the Music They Like", at http://www.microsoft.com/presspass/features/2001/apr01/04-03msnmusic.mspx, Apr. 3, 2001, 2 pages.

* cited by examiner

AUTO PLAYLIST GENERATOR

TECHNICAL FIELD

The present invention generally relates to list generation data processing and more particularly to music playlist generation based on identifying data and descriptive metadata.

BACKGROUND OF THE INVENTION

As users gain access to ever more information, recommendation systems are starting to become more popular. A recommendation system typically generates a list of items with which a user may wish to interact. The list could be, for example, a list of items the user may wish to buy in the future or a list of items that the user may wish to be entertained with next, as in a playlist of songs to play immediately.

There are several methods for generating recommendation lists, each having its own limitations. In collaborative filtering, lists are generated by observing usage patterns of many users. The usage patterns are then used to predict what the current user would like. Collaborative filtering is applicable to many media types, (e.g., documents, books, music, movies, etc.). Collaborative filtering is limited in that it does not utilize descriptive metadata of the list items: it only relies on usage patterns. Therefore, collaborative filtering does not utilize items unless they have reached a certain level of usage. Metadata, as employed in the context of this application, refers to data concerning a media object, rather than the media object itself.

In on-line music services a user can generate a list of music on a server. This list of music can be generated by collaborative filtering (as above), or by computing the similarity of a "seed" song to music available on the server. There are several limitations on such on-line music services, however. First, these services should adhere to the Digital Millennium Copyright Act. Therefore, generated lists cannot be fully under the control of the users. Second, the user can only select amongst items that are available on the service. The user may wish to generate lists of items that are owned by the user, so that the user can have full access to those items. Unfortunately, the on-line systems are incapable of assigning their descriptive metadata to arbitrary user items. Another limitation of on-line music services is that their similarity functions are hand-designed, rather than generated by a machine learning algorithm.

Client-side music jukeboxes will automatically generate lists of user items that are fully editable and playable by the user. However, these client-side music jukeboxes are limited in that they force the user to design complex rules that govern the playlist. The user interface for designing such rules is complicated and intimidating. Another limitation of these jukeboxes is that the descriptive metadata for the songs is typically only available if the user digitizes an entire CD of music. This is because songs can only be identified from the Table of Contents of an entire CD. Individual tracks cannot be identified and thus cannot undergo list processing. A further limitation of these jukeboxes is that the descriptive metadata generally available is limited to broad categories, such as genre. Such broad descriptive metadata is not very effective in generating good lists of items.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method for producing a list (e.g., a song playlist) where the items in the generated list (e.g., songs in a playlist) are similar to a seed item (e.g., a seed song) and where the processing involved in generating the list includes both producing "as-added" identifying data associated with user items as they are added to a user item library, and generating a list where the as-added identifying data is considered. Such "as-added" identifying data associates the user items with reference metadata to known items, thus allowing list processing to apply to a wide range of possible user items. While the present invention is described primarily in relation to song playlists, it is to be appreciated that the present invention may be employed to produce other lists (e.g., movie lists, book lists, music video lists).

The present invention facilitates creating a playlist of songs from a media library accessible to a user ("candidate songs") where the playlist comprises songs that are related (e.g., similar) to one or more seed songs selected by the user. An identifying system is employed to produce as-added identifying data associated with the candidate songs as they are added to the media library. Once a seed item is provided to the list generating system, the as-added identifying metadata of the seed song is used to associate descriptive metadata in a reference metadata database. The present invention then compares candidate song descriptive metadata to seed song descriptive metadata to compute a similarity value. One or more data structures (e.g., lookup tables) that were generated by one or more machine learning algorithms may be employed in determining the similarity value through feature vector comparison processing, for example.

The present invention thus simplifies list generation for user items by reducing user actions to selecting one (or more) "seed" items. The invention further facilitates users utilizing a wide range of list items, so long as the list items have some identifying metadata. The present invention achieves improvements over conventional systems by using more specific metadata than commonly available to client-side music jukeboxes and by employing machine learning to generate the similarity function, rather than hand designing a similarity function.

In accordance with one aspect of the present invention, a system that facilitates generating lists is provided. The system includes a user data store that either stores or refers to user items, (e.g., songs, movies, music videos), an item identifying system that performs inexact matching between identifying metadata associated with new user items and identifying metadata stored in a reference metadata database, and a list generating system that receives a seed item, analyzes descriptive metadata associated with the seed item and/or the user items, and matches the seed item(s) to a subset of the user items. The list generation system then outputs a list corresponding to the subset of user items. In one example of the present invention, the user data store and the list generation system reside on a client device. In another example of the present invention, the user items are songs that are identifiable by an artist name, an album name and/or a track name and are related to descriptive metadata that includes information concerning a genre, a subgenre, a style, a mood, a vocal coding, a rhythm type and/or a rhythm description.

Another aspect of the present invention provides a system that facilitates generating lists. The system includes a media library data store that stores user items, a reference metadata database that stores as-added descriptive metadata associated with user items, a item identifying system operable to associate descriptive metadata with a user item, and a list generation system operably connected to the media library data store and the reference metadata database. The list generation system includes a seed item input subsystem adapted to receive at least one seed item, a similarity subsystem operable to produce a similarity value that characterizes the degree to which a candidate client item and the seed item(s) are similar, and a list generating subsystem operably connected to the similarity subsystem, where the list generating subsystem produces a list based, at least in part, on the degree to which candidate client items are related to the seed item(s).

Yet another aspect of the present invention provides a computer readable medium containing computer executable components for a system that facilitates generating lists. The system components include a seed item input component adapted to receive seed item(s), an identifying component adapted associate descriptive metadata to user items, a similarity component that produces a similarity value that characterizes the degree to which a candidate user item and the seed item(s) are similar and a list generating component that produces a list based, at least in part, on the degree to which candidate user items are related to the seed item.

Yet another aspect of the present invention provides a method for generating a list. The method includes producing as-added descriptive metadata associated with one or more candidate user items, producing similarity data that characterizes the similarity between a candidate user item and user-selected seed item(s), and producing a list of one or more user items related to the seed item(s). The similarity data is a difference vector, where the difference is taken between two different feature vectors, each of which describes a candidate user item and a seed item. In one example method, the user items can be songs, music videos, movies, documents, books, and/or images, the item identifying data can be an artist, a collection name and/or a work name, and a feature vector can have fields associated with a genre feature, a subgenre feature, a style feature, a mood feature, a vocal coding feature, a rhythm type feature and/or a rhythm description feature, for example.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
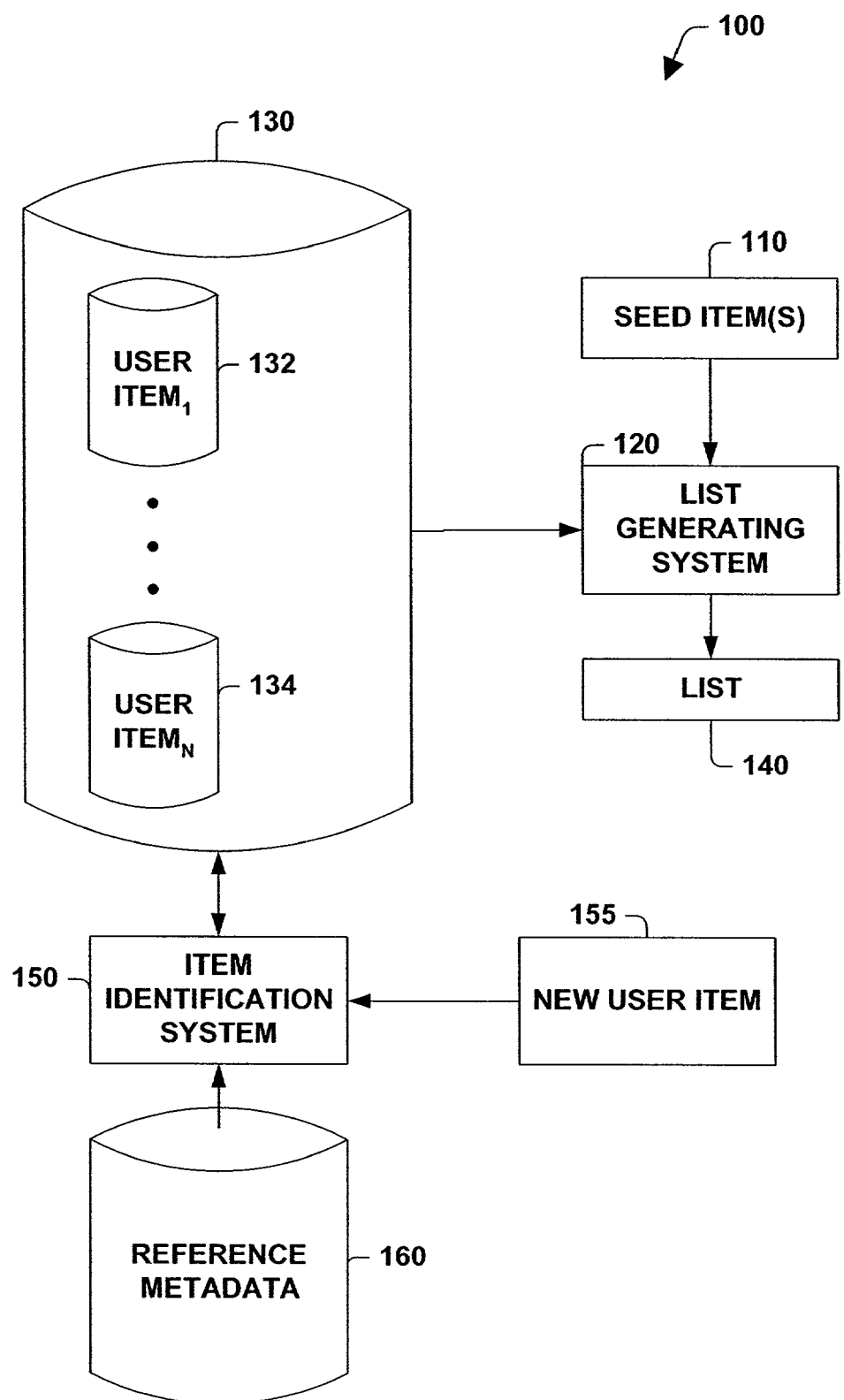
FIG. 1 is a schematic block diagram of a system that facilitates generating lists in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

It is to be appreciated that various aspects of the present invention may employ technologies associated with facilitating unconstrained optimization and/or minimization of error costs. Thus, machine learning systems/methodologies (e.g., back propagation, Bayes nets, fuzzy logic, non-linear regression, or other machine learning paradigms including mixture of experts, radial basis functions, directed search networks and function link networks) may be employed.

Referring initially to FIG. 1, a system 100 that facilitates generating a list 140 is illustrated. The system 100 includes a user data store 130 that contains one or more user items (e.g., USER ITEM$_1$ 132 through USER ITEM$_N$ 134, N being an integer). The data store 130 may be, for example, a library, a database or the like. The user items may be, for example, songs, music videos, movies, documents, books, images, etc. The user items may be described by identifying information including, but not limited to, the name of the item (e.g., song title, music video title) and the performer of the item (e.g., artist), for example. The user items may also be associated with descriptive metadata that characterizes the item. For example, for a song user item, the descriptive metadata may include information concerning the genre of the item (e.g., folk, jazz, new wave) and the mood of the item (e.g., soothing, lonely, wild).

The system 100 includes a list generating system 120 that accepts one or more seed items 110 as an input and produces a list 140 of user items that are related to the seed item(s) 110. The relationship between the seed item(s) 110 and the user items may be, for example, a degree of similarity between the items. For example, if a user wants to hear similar songs, the list 140 may contain songs that are similar to the seed item(s) 110 (e.g., similar genre, similar mood), while if the user wants to hear a mix of dissimilar songs, the list 140 may contain songs that differ from the seed item(s) 110 (e.g., different genre, different mood).

The seed item(s) 110 can be identified by identifying metadata like the name of the item and the artist of the item, for example. The seed item(s) 110 can also be associated with descriptive metadata that characterizes the seed item(s). Thus, the list generating system 120 may access the user data store 130 to locate candidate user items to compare to the seed item(s) 110 to facilitate producing the list 140. After candidate items have been identified, candidate user item descriptive metadata may then be compared to seed item descriptive metadata to determine the similarity between the seed item(s) 110 and the candidate user items.

The candidate user items may be updated by the addition of a new user item (e.g., new user item 155). Since the identifying data and/or descriptive metadata associated with the new user item 155 may not be consistent between the new user item 155 and a schema that describes descriptive metadata associated with user items already stored in the user data store 130, inexact matching involving the identifying data may be required. Thus, an identifying system 150 is employed to read and write user items. The item identifying system 150 may refer to a reference metadata data store 160 when identifying an item, for example. The identifying system 150 facilitates a user generating lists of items stored in the user data store 130 by mitigating problems associated with data inconsistencies between new items, user items and pre-established data. Although the identifying system 150 is illustrated operating in connection with the reference metadata 160 and songs, it is to be appreciated that other items may be identified and stored, and thus other lists may be generated in accordance with the present invention. By way of illustration, if the user items are documents, then the item identifying system 150 may, for example, hash the contents of the documents to produce unique identifiers, and the reference metadata 160 would contain the hash values. By way of further illustration, if the user items are multimedia (e.g., images, sounds, videos, etc.) then fingerprinting technology may be employed to uniquely identify the user items based on their contents. When the item identifying system 150 has completed its processing, then unique identifiers associated with the user items will have been computed. The item identification system 150 can operate autonomously, or may, for example, ask the user to intervene in difficult cases.

The item identification system 150 may process data including artist, song and album name data to identify a user item and to relate it to descriptive metadata stored in the reference metadata 160. Processing associated with such identifying is discussed in association with FIG. 9.

In one example of the system 100, the user data store 130 and the list generating system 120 are located on a client machine. Identifying data and/or descriptive metadata associated with user items may be transmitted from a server to the client, via push, pull and/or other processes to facilitate client-side list generation. Thus, reductions in bandwidth requirements and server side processing time are achieved and the user of the client-side system can achieve increases in privacy, providing advantages over conventional on-line recommendation systems.

Figure 2:
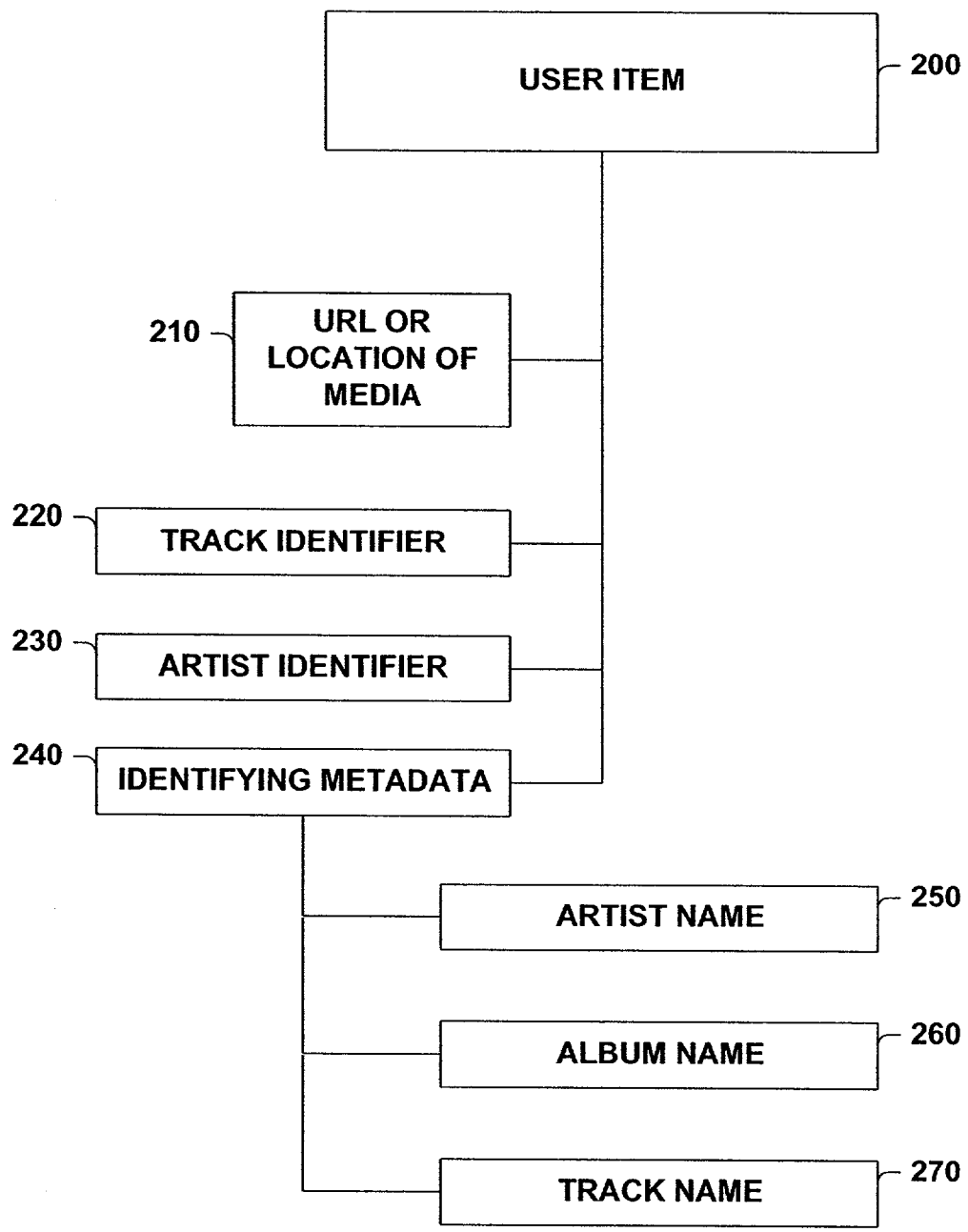
FIG. 2 is a schematic block diagram of identifying data associated with an example user item employed in accordance with an aspect of the present invention.

Turning now to FIG. 2, an example of information associated with a user item 200 is illustrated. The example information associated with the user item 200 includes a URL/location pointer 210 to the location of the actual media item (e.g., a song). As an alternative, the actual media item can be stored within the user item 200. Although the present invention is described primarily in relation to songs, it is to be appreciated that the user items can include, but are not limited to, songs, movies, music videos, documents, books, poems, images (e.g., photographs), for example. The user item 200 is also associated with a unique track identifier 220 and a unique artist identifier 230. The user item 200 is also associated with identifying metadata 240. For a song, the identifying metadata 240 may include an artist name 250, an album name 260 and a track name 270. By way of illustration, the artist name 250 may be the name of a solo artist who performed a song or the name of a group that performed the song and an associated list of group members. By way of further illustration, the album name 260 may be the name of the album on which the song appeared and other information like the release date of the album. By way of still further illustration, the track name 270 may include the name of the song, the length of the song, the amount of time between the first note of the song and the first lyric (if any) and the size (e.g., in kilobytes) of the song, for example. Such metadata (e.g., artist, album, track) can be employed to generate unique identifiers. Since the metadata may vary between metadata databases, inexact matching between items may be required. Furthermore, since the metadata may be incomplete, the present invention facilitates performing the inexact matching with such incomplete data.

The purpose of the inexact matching employed in the item identification process is to read the identifying metadata from the user items and to create unique identifiers. The unique identifiers may then refer, for example, to one or more rows in a reference metadata database. In the case of a song, the item identification process will attempt to assign a unique track identifier (e.g., 220) and a unique artist identifier (e.g., 230) to user items to facilitate, for example, accessing, storing and/or manipulating songs identified by the unique identifiers.

Figure 3:
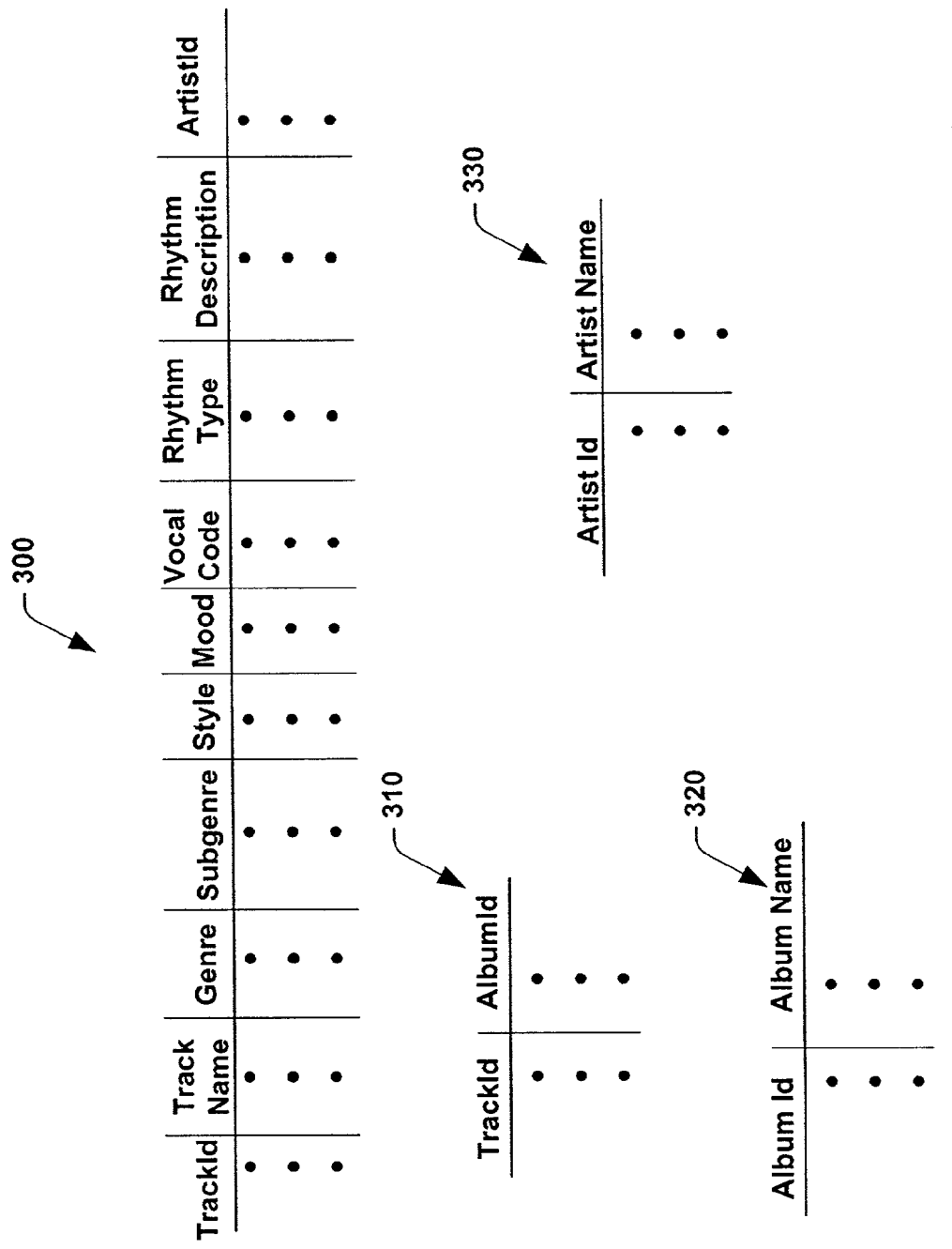
FIG. 3 is a schematic block diagram of a schema employed in storing and/or retrieving descriptive metadata in accordance with an aspect of the present invention.

FIG. 3 illustrates one sample reference metadata database schema. The sample reference metadata database includes four tables, although it is to be appreciated that other reference metadata databases may employ a greater or lesser number of tables. Table 300 illustrates per track metadata for songs. Thus, table 300 includes a unique track identifier field, a unique artist identifier associated with the unique track, a track name, a genre, a subgenre, a style, a mood, a vocal code, a rhythm type and a rhythm description. Table 310 stores many to many relationships between tracks and albums, where each row is an occurrence of a track on an album. Table 320 represents an album, where the album is associated with a unique album identifier and an album name. Table 330 represents an artist, where an artist is associated with a unique artist identifier and an artist name. To speed access into the database associated with the tables 300, 310, 320 and 330, indices on the unique identifiers and full-text indexing of names may be employed. Although the tables 300, 310, 320 and 330 are illustrated in the sample reference metadata database schema, it is to be appreciated that in a different example of the present invention, the item identification system may not employ such tables and may interact directly with artist and track metadata or utilize a different schema, as in the case of movies, documents, or books.

Figure 4:
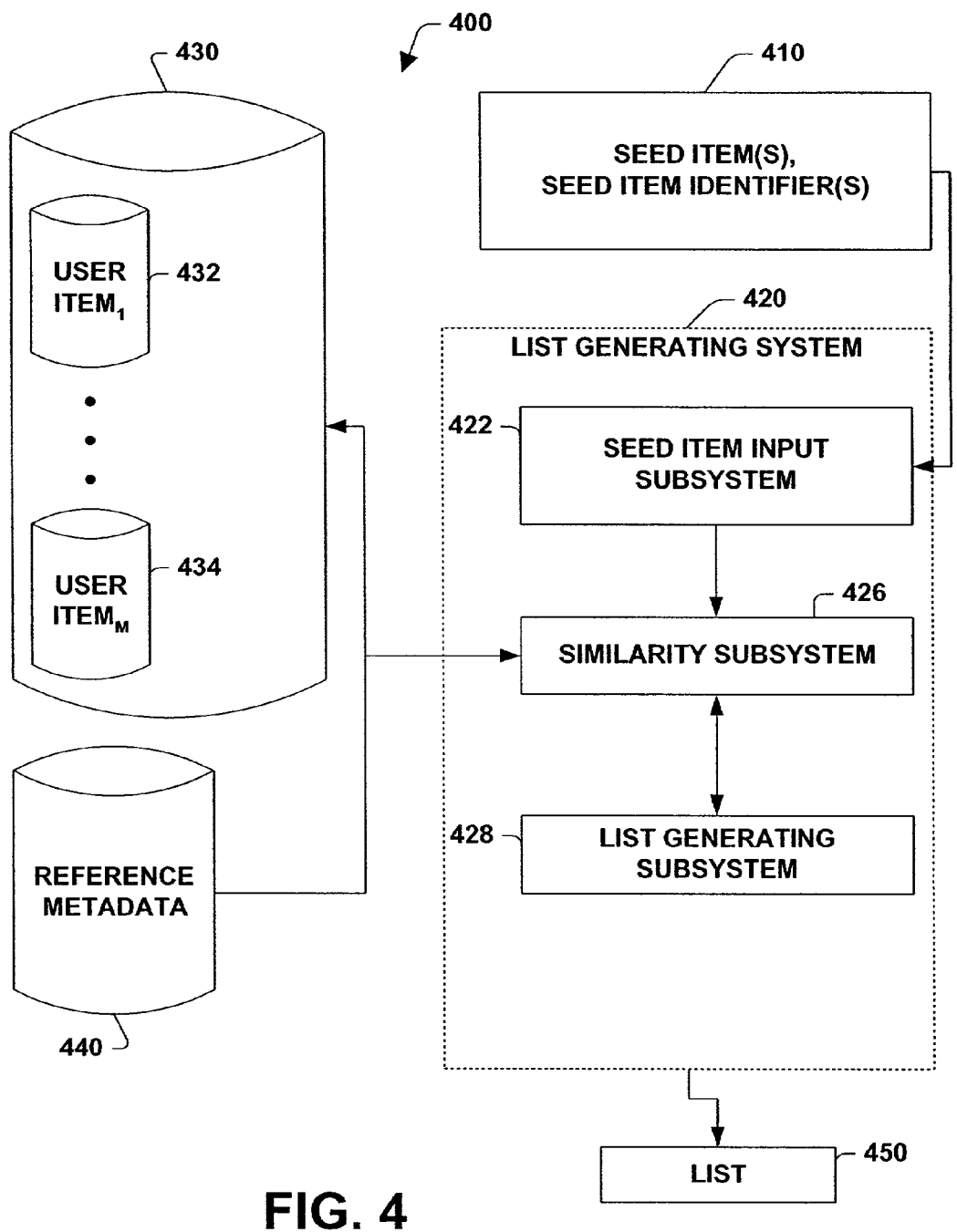
FIG. 4 is a schematic block diagram of a system employed in generating lists in accordance with an aspect of the present invention.

FIG. 4 illustrates a system 400 that facilitates generating lists by inputting seed item(s) and/or seed item identifier(s) (e.g., unique identifiers) and determining a degree of similarity between the seed item(s) and one or more candidate user items. The system 400 includes a user data store 430 that contains one or more user items (e.g., USER ITEM$_1$ 432 through USER ITEM$_M$ 434, M being an integer). The user items can include items like songs, movies, music videos, documents, books and the like, for example. The system 400 includes a list generating system 420 that can have one or more subsystems (e.g., seed item input subsystem 422, similarity subsystem 426, list generating subsystem 428) that are employed to produce a list 450. The list 450 can include one or more user items and/or data sufficient to identify and/or retrieve one or more user items, where the user items are placed in the list 450 based on a similarity criterion between the user items and the seed item(s). By way of illustration, if a user wants to view a group of music videos that are from the same genre with a similar rhythm (e.g., punk, frenetic), then appropriate similarity criteria can be employed to produce a list 450 of such similar songs. By way of further illustration, if a user wants to view a mixed group of music videos (e.g., pop, rock, country) then other appropriate similarity criteria can be employed to produce the list 450 of such mixed songs.

The list generating system 420 can accept as input seed item(s) and/or seed item identifier(s) 410. By way of illustration and not limitation, a user may interact with the list generating system 420 by providing a song to the list generating system 420 and directing the list generating system 420 to select similar songs. By way of further illustration and not limitation, a user may alternatively, and/or additionally interact with the list generating system 420 by providing a unique seed song identifier. The seed item(s) 410 can be accepted by the seed item input subsystem 422 which can perform pre-processing on the seed item information 410 (e.g., validation, formatting) before passing it to the similarity subsystem 426, which can compare descriptive metadata associated with the seed item(s) 410 to descriptive metadata associated with the candidate user item to determine a degree of similarity that can be employed by the list generating subsystem 428 to determine whether the candidate user item should be included in the list 450. In one example of the present invention, the user data store 430 and the list generating system 420 reside on a client system. The similarity system 426 may access the user data store 430 and a reference metadata data store 440 to make the determination of similarity.

Figure 5:
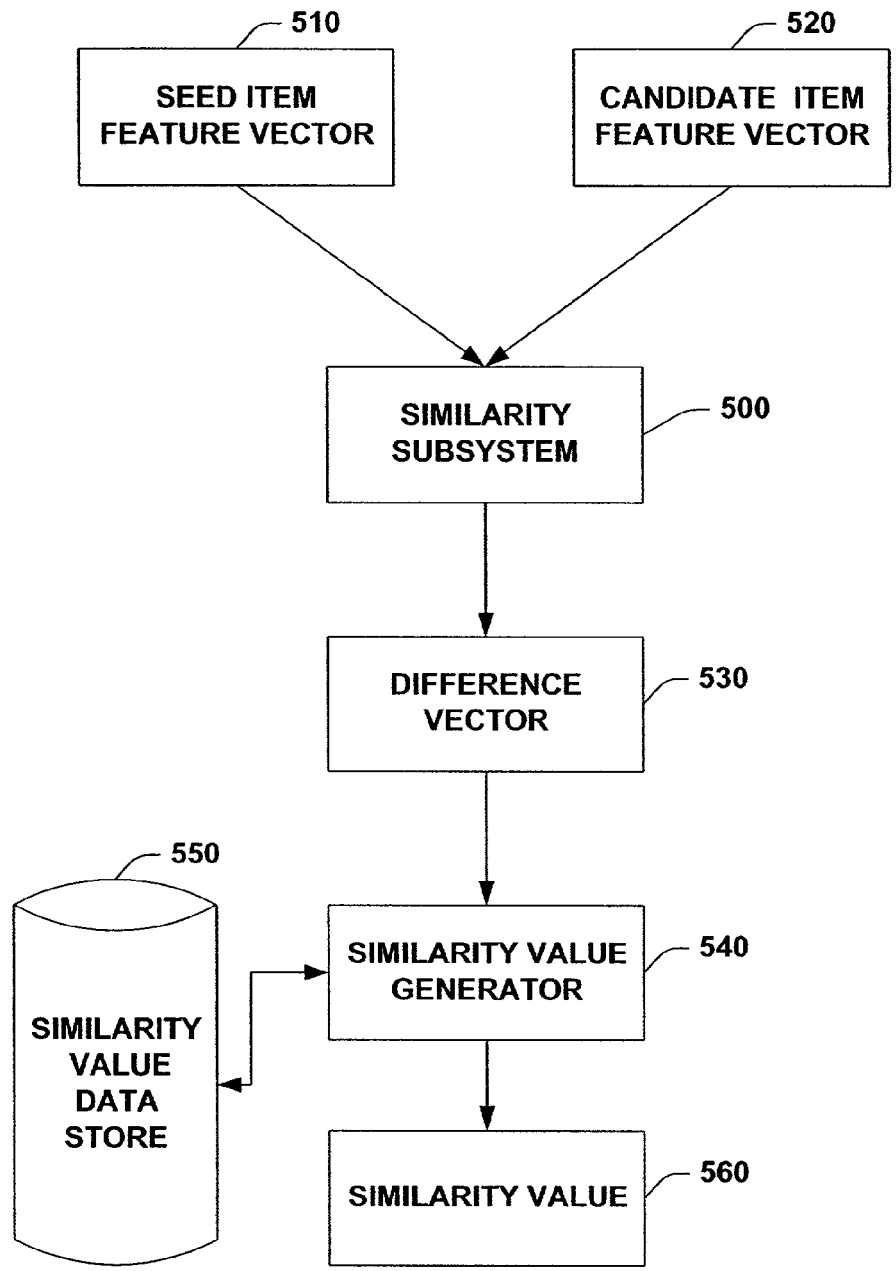
FIG. 5 is a schematic block diagram of a subsystem for computing a similarity value that employs feature vectors and a similarity value data store, in accordance with an aspect of the present invention.

Turning now to FIG. 5, a similarity subsystem 500 and a similarity value generator 540 employed in computing a similarity value 560 are illustrated. The similarity subsystem 500 accepts as inputs a seed item feature vector 510 and a candidate item feature vector 520. While FIG. 5 refers primarily to feature vectors and feature vector similarity processing, it is to be appreciated that other similarity analysis techniques may be employed in accordance with the present invention. In one example of the present invention, the seed item feature vector 510 includes fields encoding information relating to genre, subgenre, genre, style, mood, vocal coding, rhythm type and rhythm description. Similarly, the candidate item feature vector 520 includes fields encoding information relating to genre, subgenre, genre, style, mood, vocal coding, rhythm type and rhythm description. Thus, the similarity subsystem 500 can compare the feature vectors using techniques known in the art (e.g., attribute wise comparison) to produce a difference vector 530. Since the seed item feature vector 510 and the candidate item feature vector 520 both code information relating to seven attributes, the difference vector 530 may be, for example, a seven bit vector. The difference vector 530 is then employed as an input to a similarity value generator 540 that can employ the difference vector 530 as an index into a similarity value data store 550 to produce the similarity value 560. The similarity value data store 550 can store, for example, a lookup table that can be employed to translate the difference vector 530 into the similarity value 560. In one example of the present invention, the similarity value data store 550 contains correlation values that were generated by machine learning techniques applied to similarity processing involving difference vectors generated from seed item feature vectors and candidate item feature vectors. One example difference vector 530 to similarity value 560 correlation table is provided below in Table I. The order of the features in the difference vector in Table I is, from left to right, mood, rhythm description, rhythm type, vocal coding, style, subgenre, and genre.

TABLE I

| | | | | | | | |
|---|---|---|---|---|---|---|---|
| 1.00000 | 1111111 | 0.65718 | 1101111 | 0.48806 | 1011111 | 0.46408 | 0111111 |
| 0.42899 | 1001111 | 0.38207 | 0101111 | 0.28465 | 1110111 | 0.27998 | 0011111 |
| 0.27839 | 0001111 | 0.22812 | 1100111 | 0.18447 | 1010111 | 0.18411 | 1000111 |
| 0.17514 | 0110111 | 0.14698 | 0100111 | 0.11046 | 0010111 | 0.11046 | 0000111 |
| 0.08364 | 1111011 | 0.07779 | 1101011 | 0.06834 | 0111011 | 0.06624 | 1011011 |
| 0.06434 | 0101011 | 0.06323 | 1001011 | 0.05369 | 0011011 | 0.05210 | 0001011 |
| 0.04052 | 1110011 | 0.03795 | 1100011 | 0.03272 | 0110011 | 0.03120 | 1010011 |
| 0.03084 | 1000011 | 0.03072 | 0100011 | 0.02814 | 1111001 | 0.02407 | 0010011 |
| 0.02407 | 0000011 | 0.02229 | 1101001 | 0.01826 | 0111001 | 0.01676 | 1011001 |
| 0.01425 | 0101001 | 0.01375 | 1001001 | 0.00962 | 0011001 | 0.00874 | 1110001 |
| 0.00803 | 0001001 | 0.00634 | 0110001 | 0.00616 | 1100001 | 0.00508 | 1010001 |
| 0.00472 | 1000001 | 0.00435 | 0100001 | 0.00419 | 1111000 | 0.00337 | 0010001 |
| 0.00337 | 0000001 | 0.00233 | 1011000 | 0.00216 | 1101000 | 0.00215 | 0111000 |
| 0.00140 | 1001000 | 0.00125 | 0101000 | 0.00124 | 1110000 | 0.00086 | 0011000 |
| 0.00065 | 0001000 | 0.00058 | 0110000 | 0.00057 | 1010000 | 0.00053 | 1100000 |
| 0.00036 | 1000000 | 0.00031 | 0100000 | 0.00029 | 0010000 | 0.00029 | 0000000 |

In Table I, the similarity values fall within the range 0 to 1.0. Examining a first entry, 1.00000 1111111, the difference vector 1111111 indicates that the seed item feature vector 510 matched the candidate item feature vector 520 in each attribute, thus, each bit of the difference vector was set to one, and the corresponding similarity value 1.00000 indicates a high degree of similarity between the two items. Examining a second entry, 0.06834 0111011, the difference vector 0111011 indicates that the seed item feature vector 510 matched the candidate item feature vector 520 in five attributes (rhythm description, rhythm type, vocal code, subgenre, and genre), and that the corresponding similarity value is 0.06834. Similarly, a third entry 0.04052 1110011 also indicates that the seed item feature vector 510 matched the candidate item feature vector 520 in five attributes (mood, rhythm description, rhythm type, subgenre and genre), and that the corresponding similarity value is 0.04052. Thus, the machine learning that was applied to the feature vectors and/or difference vectors determined that the combination of five matched attributes coded in the difference vector 0111011 should result in a higher similarity value than the five matched attributes coded in the difference vector 1110011. While one table of difference vectors and similarity values are described in connection with FIG. 5, it is to be appreciated that other such tables may be employed in accordance with the present invention, where such tables are hand coded, machine coded and/or the result of machine learning algorithms. It is to be further appreciated that although difference vectors and feature vectors with seven attributes are discussed in connection with FIG. 5, that difference vectors and/or feature vectors with a greater or lesser number of attributes, and/or with different attributes may be employed in accordance with an aspect of the present invention.

The system in FIG. 5 operates on one seed item, while the system in FIG. 4 can operate on more than one seed item. There are various ways of combining multiple similarity scores into one similarity score. For example, the similarity score between every seed item and a candidate item can be averaged together to yield a single similarity score that would be used by list generation subsystem 428. It is to be appreciated that other techniques, such as weighted average, or median, can also be used.

Tables such as table I can be generated using the following machine learning algorithm. Let $K_{ij}$ be defined by a training set of albums (or playlists) such that $$K_{ij} = \sum_n f_n(s_i)f_n(s_j)$$

where $f_n(s_i)$ is defined to be 1 when song $s_i$ appears on the nth album (or playlist), 0 otherwise. It is to be appreciated that the matrix $K_{ij}$ is sparse, and hence can be stored and manipulated as a sparse matrix. The weights in the lookup table can be computed by first solving the sparse quadratic program $$\operatorname*{argmin}_{\alpha}\left(K_{ij} - \sum_k \alpha_k \psi_k(s_i,s_j)\right)^2$$

subject to the constraints that all $a_k$ are non-negative. The $a_k$ become a second layer of trainable weights, and the $?_k$ are the first-layer of fixed basis functions, defined to be 1 if $A_{kl}$ is 0 or $x_{il}$ has the same value as $x_{jl}$ for all l, where $A_{kl}$ is further defined to be the lth bit of the binary representation of the number k, and where $x_{il}$ is the lth metadata feature of the song $s_i$. In the case of the metadata feature vectors described above, l will range from 1 to 7 and k will range from 0 to 127, although other metadata feature vectors and other ranges are possible. Solving sparse quadratic programs is known in the art. The two-layer system can be represented in a lookup table, such as that shown in Table 1, by computing $L_m$ (the mth lookup table entry) via $$L_m = \sum_k \alpha_k g_{km}$$

where $g_{km}$ is defined to be 1 if $A_{kl}$ is zero or $A_{ml}$ is 1 for all l, and 0 otherwise. It is to be appreciated that other machine learning algorithms can be used to generate such lookup tables, or the lookup table can be hand-designed.

In view of the exemplary systems shown and described above, methodologies that may be implemented in accordance with the present invention, will be better appreciated with reference to the flow charts of FIGS. 6 through 8 and 10. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 6:
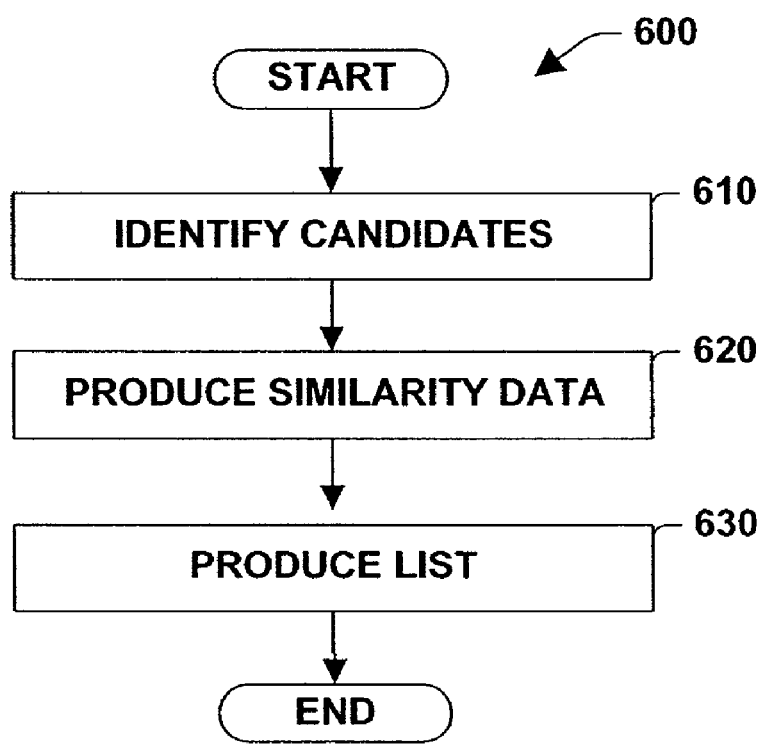
FIG. 6 is a flow chart illustrating one example method for producing a list in accordance with an aspect of the present invention.

FIG. 6 illustrates a method 600 for generating a list. At 610, one or more candidate user items related to a seed item are identified. Such identification can be achieved by methods including, but not limited to, examining unique identifiers. At 620, similarity data that characterizes the similarity between a candidate user item and the seed item is produced. Such similarity processing can include, but is not limited to, feature vector processing, as described in connection with FIGS. 10 through 12. At 630 a list of one or more user items related to the seed item is produced. In one example of the present invention, identifying the candidates, producing the similarity data and producing the list are performed at a client component. The method illustrated in FIG. 6 is a high level method, which will now be described in greater detail.

Figure 7:
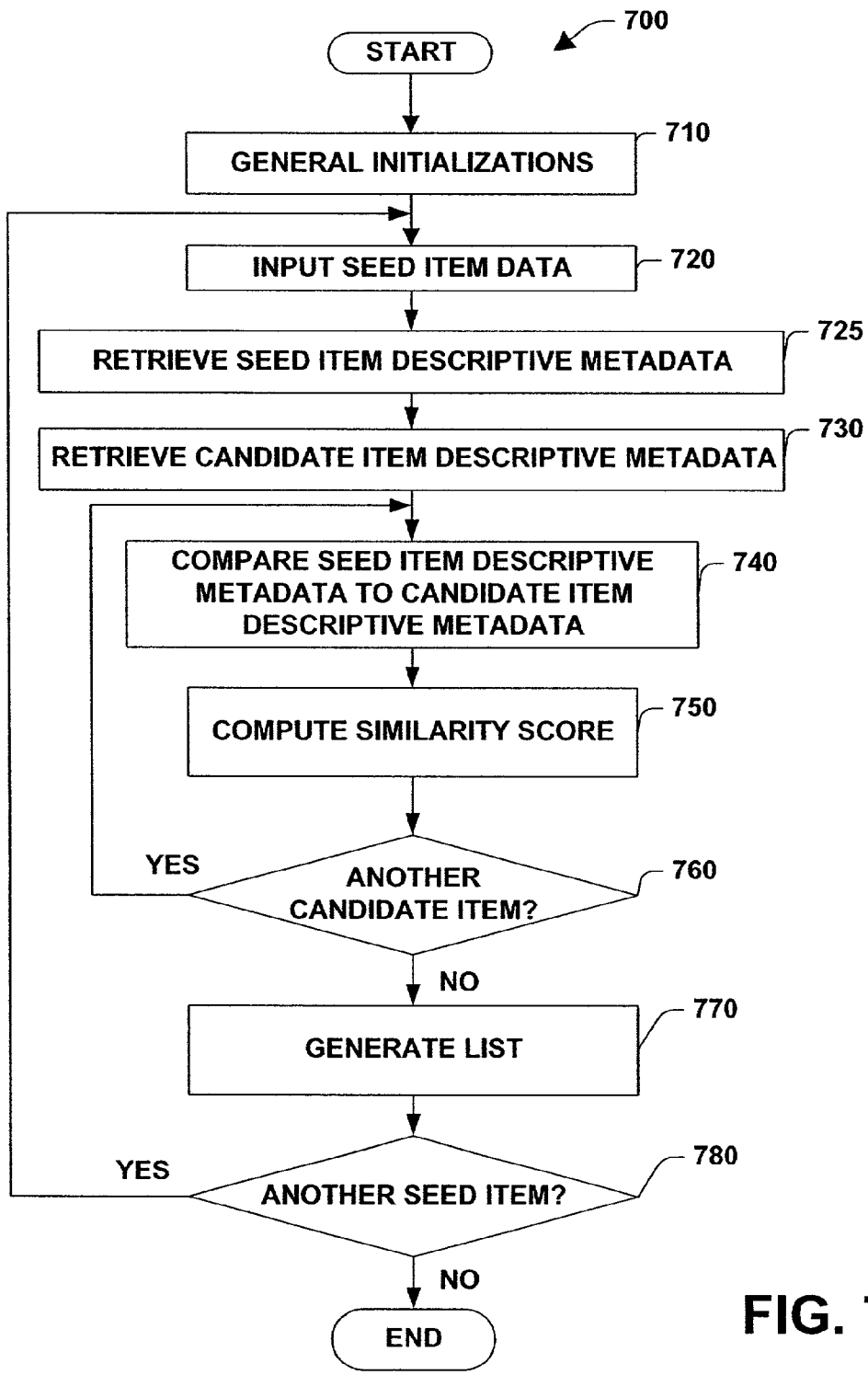
FIG. 7 is a flow chart illustrating one example method employed in producing a similarity score employed in generating a list in accordance with an aspect of the present invention.

FIG. 7 illustrates a method 700 for producing a list. At 710, general initializations occur. Such initializations include, but are not limited to, allocating memory, establishing pointers, establishing data communications, acquiring resources, setting initial values for variables and displaying process activity.

At 720, seed item data is input. Such data may include, but is not limited to, at least one seed item and/or at least one seed item identifier (e.g., a GUID or a database table index). At 725, the seed item(s) and/or the seed item identifier(s) can be employed to retrieve seed item descriptive metadata. The processing at 725 may retrieve a complete set of descriptive metadata or an incomplete set of descriptive metadata may be retrieved. If incomplete descriptive metadata is retrieved, modified processing will be required at 740 to compare the seed item(s) to the user item.

At 730, candidate item descriptive metadata is retrieved. Again, the retrieval at 730 may yield a complete set of metadata for the candidate item or it may yield an incomplete set of metadata for the candidate item. If an incomplete set of metadata is retrieved, then modified processing may be required to compare the seed item to the candidate item.

At 740, the seed item descriptive metadata is compared to the candidate item descriptive metadata. As explained above, such comparison may be between complete sets of metadata for the seed item and the candidate item or between complete and/or incomplete sets of descriptive metadata. One possible method for comparing the seed item descriptive metadata and the candidate item descriptive metadata is to form feature vectors from the descriptive metadata. Other comparison techniques known in the art may also be employed in accordance with the present invention. One possible feature vector comparison technique is described in connection with FIGS. 11 and 12.

At 750, a similarity score is produced. The similarity score represents the degree to which the seed item descriptive metadata is related to the candidate item descriptive metadata. One possible method for producing a similarity score is described in connection with FIG. 12. Although FIG. 12 refers primarily to looking up a similarity score related to a difference vector, it is to be appreciated that other similarity score computations (e.g., a similarity function) may be employed in accordance with the present invention.

At 760, a determination is made concerning whether another candidate item is available to be compared to the seed item. If the determination at 760 is YES, then processing continues at 740, otherwise processing proceeds to 770. At 770, a list is generated. The list will be based, at least in part, on the similarity scores computed at 750. For example, the similarity scores of 750 may be stored and sorted, and then at 770 the top Y items (e.g., 30) may be added to the list. Similarly, the similarity scores of 750 may be stored and sorted, and then at 770 a random assortment of items related to the similarity scores above a threshold value may be included in the list.

At 780, a determination is made whether another seed item remains to be processed. If the determination at 780 is YES, then processing continues at 720, otherwise processing concludes.

Figure 8:
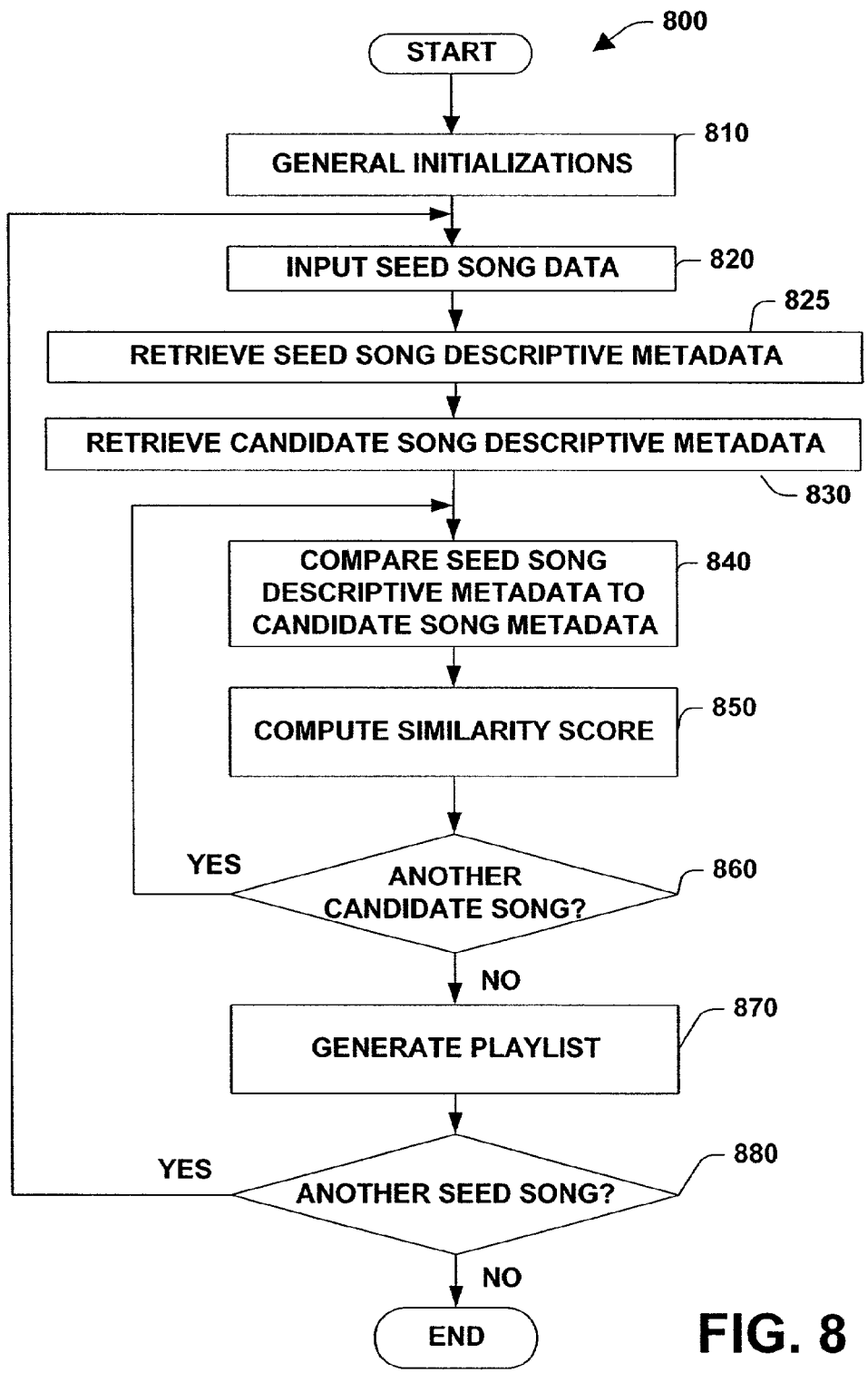
FIG. 8 is a flow chart illustrating one example method employed in producing a list in accordance with an aspect of the present invention.

Whereas the method 700 dealt with generic user items, FIG. 8 illustrates a method 800 for generating a playlist of songs. At 810, general initializations occur. Such initializations include, but are not limited to, allocating memory, establishing pointers, establishing data communications, acquiring resources, setting initial values for variables and displaying process activity. At 820, seed song data is input. Such data may include, but is not limited to, at least one song and/or at least one song identifier (e.g., a GUID, a database table index). A song identifier can include, but is not limited to, information concerning the song artist(s), the song name and the album on which the song appeared. At 825, the seed item(s) and/or the seed item identifier(s) can be employed to retrieve seed item descriptive metadata. In one example of the present invention, the song descriptive metadata includes genre information, subgenre information, style information, mood information, vocal coding information, rhythm type information and rhythm description information. The genre information provides a way to classify a song. For example, a song may be identified as being in a genre (e.g., metal, punk, alternative, folk, reggae). While five genres are identified above, it is to be appreciated that a greater or lesser number of genres may be employed in accordance with the present invention. Similarly, the subgenre information can be employed to further classify a song. For example a song may be characterized as being in a subgenre (e.g., punk, new punk, before and beyond punk). While three subgenres are identified above, it is to be appreciated that a greater or lesser number of subgenres may be employed in accordance with the present invention. Style information can similarly be employed to further describe a song. For example, a song may be classified as being of a certain style (e.g., east coast rap, west coast rap, jazz rap, gangsta rap). While four styles are identified above, it is to be appreciated that a greater or lesser number of styles may be employed in accordance with the present invention. Likewise, mood information can be employed to describe a mood for a song (e.g., dreamy, soothing, fun, depressing). While four moods are identified above, it is to be appreciated that a greater or lesser number of moods may be employed in accordance with the present invention. Additionally vocal coding information (e.g., female, female/female, male, male/male, instrumental), rhythm type information (e.g., straight, shuffle, swing, disco) and the rhythm description information (e.g., frenetic, steady, throbbing, free) can be employed to describe a song. While five vocal codings, four rhythm types and four rhythm descriptions are identified above, it is to be appreciated that a greater or lesser number of such items may be employed in accordance with the present invention.

The processing at 825 may retrieve a complete set of descriptive metadata or an incomplete set of descriptive metadata. For example, of the seven descriptive metadata attributes identified above, information concerning only five may be available, or, no descriptive metadata for the seed song may be available. In such a case, modified processing will be required at 840 to compare the seed song to the user song.

At 830, candidate song descriptive metadata is retrieved. In one example of the present invention, descriptive metadata substantially similar to the metadata described in connection with the seed song(s) of 825 is retrieved. Again, the retrieval at 830 may yield a complete set of metadata for the candidate song or it may yield an incomplete set of metadata for the candidate song. If an incomplete set of metadata is retrieved, then modified processing may be required to compare the seed song to the candidate song. In cases where the seed song metadata is incomplete and the candidate song metadata is incomplete, then a third case of modified processing may be required.

At 840, the seed song descriptive metadata is compared to the candidate song descriptive metadata. As explained above, such comparison may be between complete sets of metadata for the seed song and the candidate song or between complete and/or incomplete sets of data. One possible method for comparing the seed song descriptive metadata and the candidate song descriptive metadata is to form feature vectors from the descriptive metadata. Other comparison techniques known in the art may also be employed in accordance with the present invention. One possible feature vector comparison technique is described in connection with FIGS. 10 through 12.

At 850, a similarity score is produced. One possible method for producing a similarity score is described in connection with FIG. 12. Although FIG. 12 refers primarily to looking up a similarity score related to a difference vector, it is to be appreciated that other similarity score computations (e.g., a similarity function) may be employed in accordance with the present invention. The similarity score is a measure of the similarity of two songs. In one example of the present invention, the similarity scores range between 0.0 (completely dissimilar) to 1.0 (very similar). Thus, a user may specify a desired similarity range when requesting a playlist. By way of illustration, the user may want similar songs (e.g., scores between 0.04 and 0.07) included in the playlist but may not want very similar songs (e.g., score above 0.07) included in the playlist. By way of further illustration, a user may desire a wide variation of songs in their playlist and thus the user may want songs with scores below 0.03, for example.

At 860, a determination is made concerning whether another candidate song is available to be compared to the seed song. If the determination at 860 is YES, then processing continues at 840, otherwise processing proceeds to 870. At 870, a playlist is generated. Which songs are included in the playlist will be based, at least in part, on the similarity scores computed at 850. For example, the similarity scores of 850 may be stored and sorted, and then at 870 the top Y items (e.g., 30) may be added to the list. Similarly, the similarity scores of 850 may be stored and sorted, and then at 870 a random assortment of songs related to the similarity scores above a threshold value may be included in the list. As described in connection with 850, user determined thresholds may be employed to determine which songs to include in the playlist. Alternatively, processing candidate items can stop when a desired number of songs above a threshold have been found. Thus, a random subset of candidate items can be considered.

At 880, a determination is made concerning whether another set of seed item(s) remains to be processed. If the determination at 880 is YES, then processing continues at 820, otherwise processing concludes.

Figure 9:
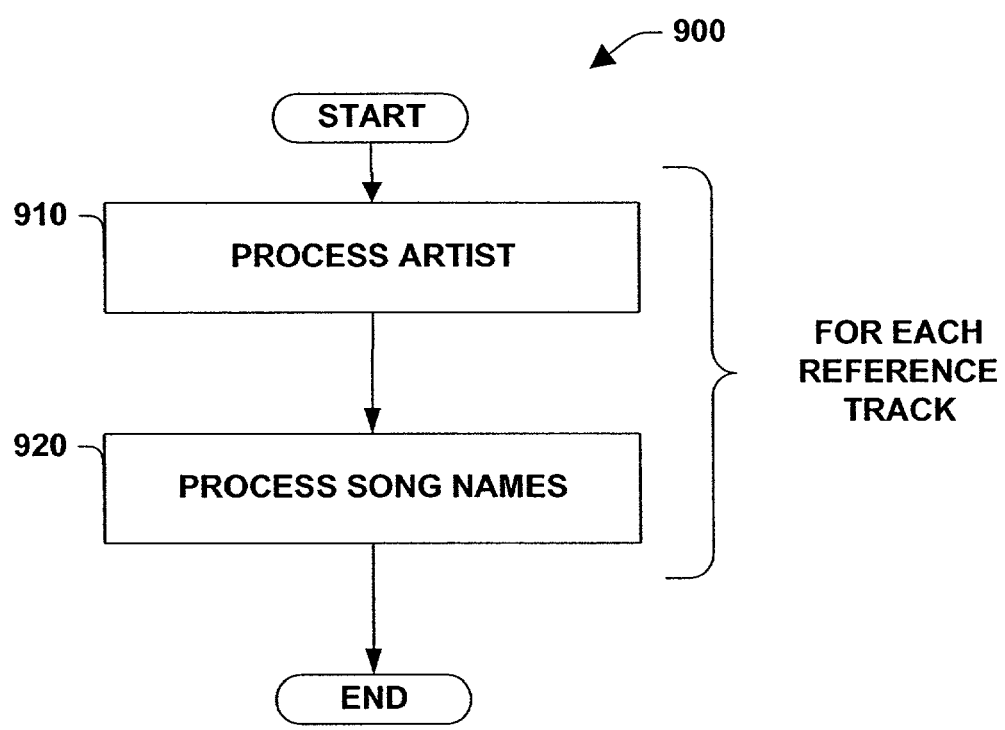
FIG. 9 is a flowchart illustrating one example method employed in producing a list in accordance with an aspect of the present invention.

FIG. 9 is a flow chart that illustrates one method employed with the present invention. At 910, processing associated with the artist occurs, while at 920, processing associated with a track occurs. The following pseudocode implements the example method for identifying an item that a user desires to add to a media library. Identifying the user item to be added to the media library involves matching identifying data associated with the user item to identifying data associated with items already identified by an identifying system. Since the identifying data associated with the user item may not be entirely consistent with identifying data associated with items already processed into the media library, inexact matching of identifying data may be required.

The method loops over reference tracks (e.g., tracks already processed into the media library by the identifying method) and the reference tracks "vote" for user items when the artist words and/or the track words in the reference track match the artist words and/or track words in the user item, where the vote indicates that the reference track believes that it matches the user item.

For each reference track
    If artist id not same as previous reference track then
        Clear user song artist votes
        Split artist name into words, canonicalize words
        For each artist word
            Increment user song artist vote for user song artist names that contain artist word End for
        For each user that received at least one artist vote
            Compute artist matching score
            If artist matching score is above threshold and artist matching
                score is better than previous artist matching score, then
                    artist id of user song = artist id of reference track
            end if
        End for
    End if
    Select user songs whose track name matches first N characters of reference track name
    If no user songs match, then return, endif
    Split reference track name into words
    canonicalize words -continued

```
    clear user song track votes
    for each track word
        increment user song track vote for user song track names that contain
        track word
    end for
    for each user song that received at least one artist vote
        add user song artist vote to user song track vote
    end for
    for each user song that has at least one track vote
        compute track matching score
        if track matching score is above threshold and track matching score is
        better than previous track
            matching score user song track id = track id of reference track
        end if
    end for
End for
```

In this example method, the reference tracks are ordered by artist identifier. For efficiency concerns, artist voting occurs when the artist identifier is not the same as the previous reference track. The user song artist votes may be stored in a sparse array, which is cleared. The artist name of the reference track may then be split into artist words, and canonicalized by converting to lower case, etc. Such splitting and canonicalization may be required, because artist, song and album information may include one or more formatted words (e.g., artist: MEGA super STAR Dude; album: super (Duper) GrEaTeSt hits Album "4.1"; track: My BIG Hit). In one example of the present invention a word is defined as a word character followed by one or more word characters, quotation marks or periods. A word character is defined as a member of the set of the letters a through z, the letters A through Z, an underscore and the digits 0 through 9. It is to be appreciated that the definition of word and word character are but one possible definition, and that other definitions of words and/or characters that may be employed in accordance with the present invention are intended to fall within the scope of the invention (e.g., international word and character definitions). The words may be canonicalized by removing periods and quotes and converting uppercase letters to lowercase, for example. Then, for each artist word, elements in the user song artist vote array are incremented when a user artist name that contains that artist word is encountered. An artist word to user item map can be precomputed before voting to increase efficiency. After the artist words have been processed, the scores for the user songs that received at least one vote are computed. If the artist matching score is above a threshold (e.g., 0.7), and better than previous artist matching scores for that user item, the artist identifier of the user item is assigned to be the artist identifier of the reference track.

For matching on track words, a subset of the user items is considered, those user items whose track names match the first N characters of the reference track name, N being an integer (e.g., 8). If no such user items match, then no voting takes place. Further processing is thus restricted to the matching user items. For efficiency, before voting, an index of words that occur in the user items with the same first N characters can also be formed. Assuming that at least one user item matched the first N characters of the reference track name, then the reference track name is split into track words and canonicalized, and the user song track vote sparse array is cleared. Then, for each track word, the method increments the user song track vote array elements that correspond to user items track names that contain the track word.

After the voting is completed, the user song artist votes are added to the user song track votes, to form a count of the number of artist/track matching words for each user song. This count is then stored in the user song track vote sparse array. Then, for each song that had at least one track vote, the track matching score is computed, and if the track matching score is above a threshold (e.g., 0.6) and better than previous track matching scores for that user song, then the track identifier for the user song is set to the track identifier for the reference track.

The matching described above may employ, for example, the following method. The number of unique exact matching words between the two artist names and the number of unique exact matching words between the two track names will be computed and stored (e.g., in a count variable MatchWords). The number of words in the first identifier that are not found in the second identifier will be counted and stored (e.g., in a count variable FirstUniques) and the number of words in the second identifier that are not found in the first identifier will be counted and stored (e.g., in a count variable SecondUniques). Thus, a matching score can be computed using, for example, an equation:

$$\text{MatchScore} = \text{MatchWords}/(\text{MatchWords} + (\text{FirstUniques} + \text{SecondUniques})/2) \quad (1).$$

It is to be appreciated that equation (1) is but one example equation that can be employed to match identifying information and that other such equations can be employed in accordance with the present invention.

Figure 10:
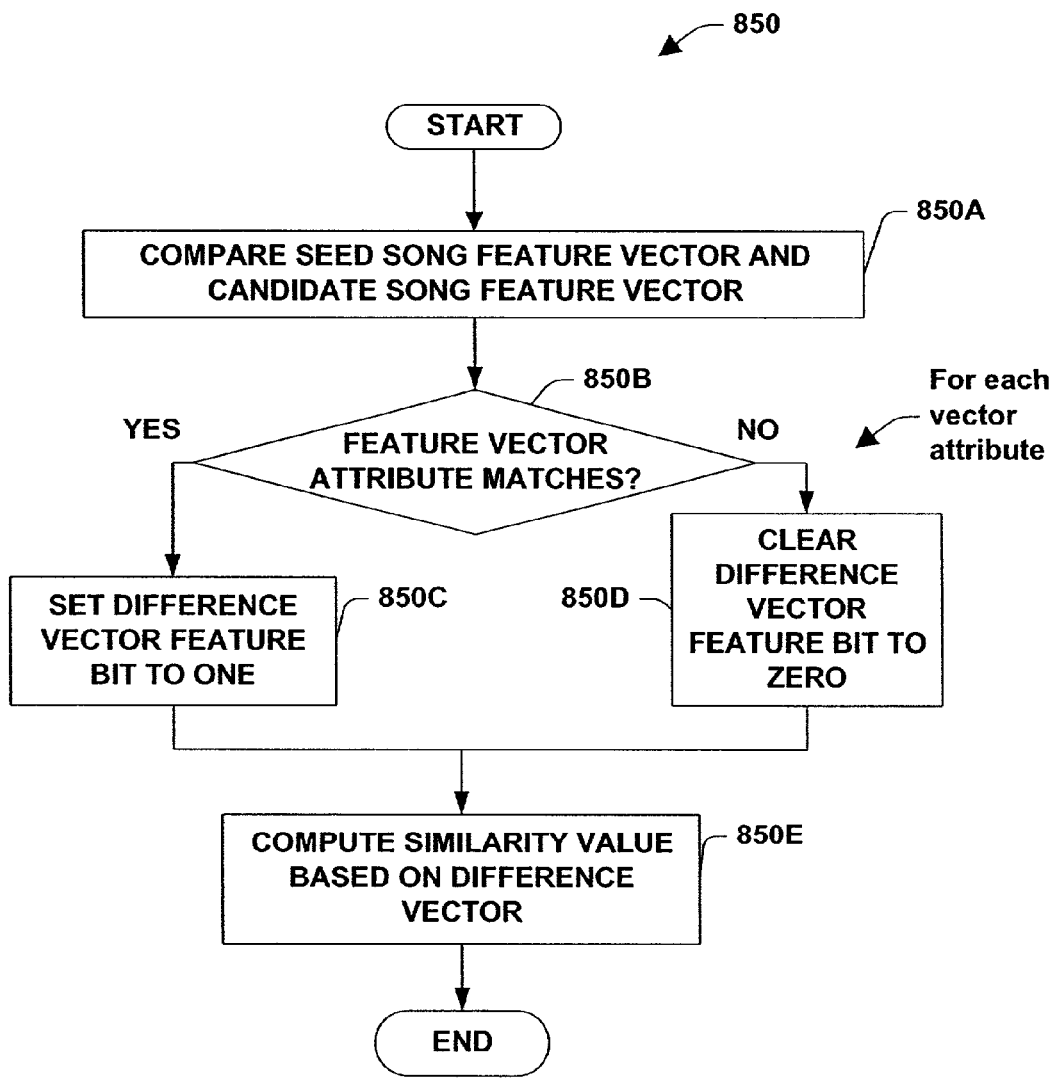
FIG. 10 is a flow chart illustrating a method for computing a similarity value in accordance with an aspect of the present invention.

FIG. 10 further illustrates processing associated with 850 (FIG. 8). FIG. 10 illustrates one possible method for producing a similarity value based on comparing feature vectors to produce a difference vector that can be employed to retrieve a similarity value. At 850A, the seed song feature vector and the candidate song feature vector are compared. In one example of the present invention, the feature vectors include seven attributes, where each attribute may have one or more possible values. For example, a mood attribute may have twenty one possible values while a style attribute may have two thousand possible values. Blocks 850B, 850C and/or 850D may be performed for each feature attribute. Thus, at 850B, a determination is made concerning whether the seed song feature vector attributes match the candidate song feature vector attributes. If the determination at 850B is YES, then at 850C, the bit corresponding to the compared attribute in the difference vector is set to one. If the determination at 850B is NO, then at 850D, the bit corresponding to the compared attribute in the difference vector is cleared to zero. Thus, a difference vector that contains one binary digit for each attribute compared between the seed song feature vector and the candidate song feature vector is created.

At 850E, a similarity value can then be computed based on the difference vector. By way of illustration and not limitation, a function that accepts as an input a difference vector and produces as an output a similarity value may be employed to produce the similarity value. By way of further illustration and not limitation, a value may be retrieved from a database table by employing the difference vector as an index into the database table. While a similarity value function and a similarity value lookup are described above, it is to be appreciated that other methods for producing a similarity value from a difference vector may be employed in accordance with the present invention (e.g., treat the difference vector as a binary number corresponding to the similarity value).

Figure 11:
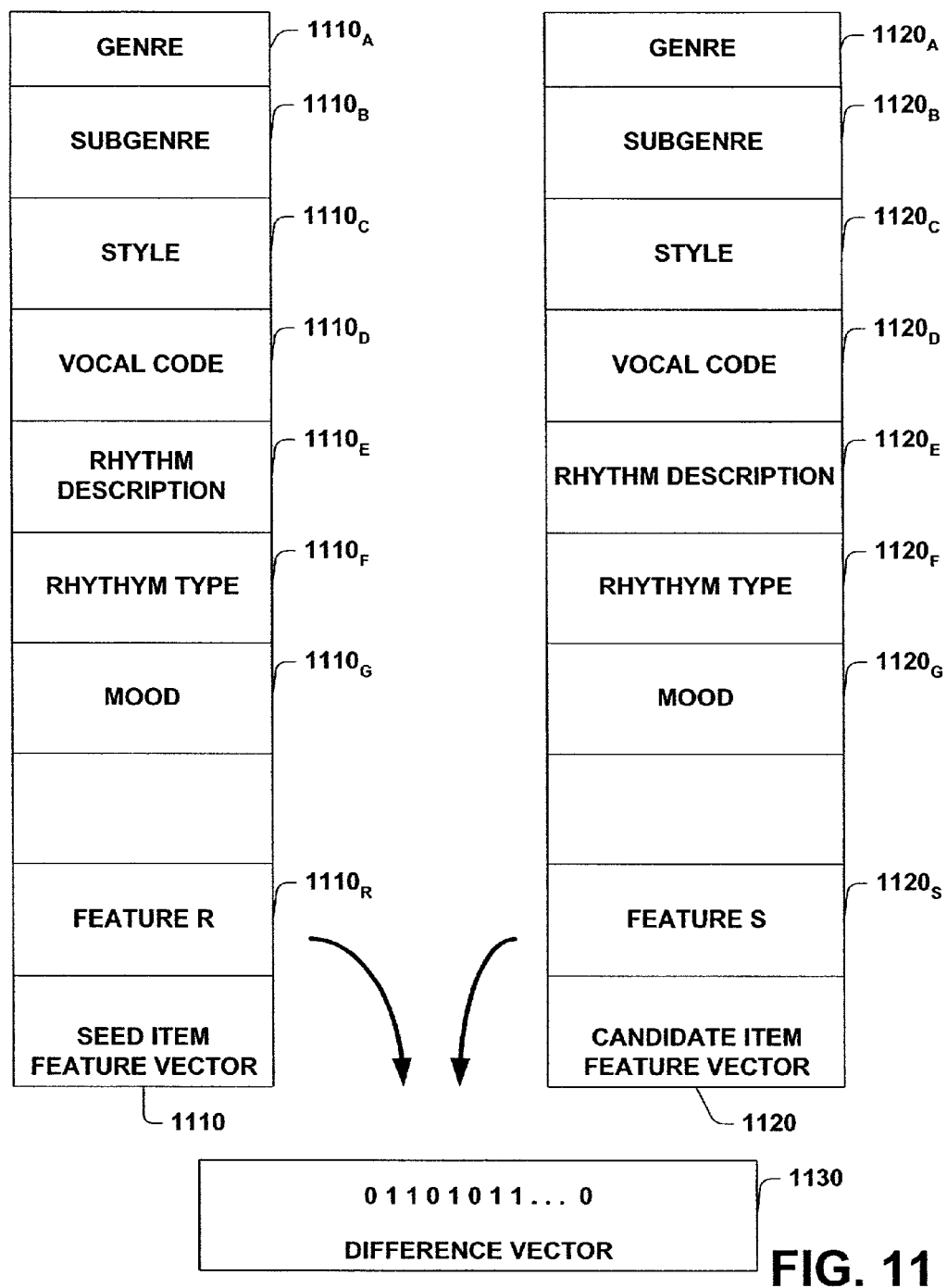
FIG. 11 is a schematic block diagram illustrating feature vectors being compared to produce a difference vector, in accordance with an aspect of the present invention.

FIG. 11 is a schematic block diagram illustrating feature vectors being compared to produce a difference vector 1130. A first feature vector 1110 may include one or more feature attributes (e.g., attributes $1110_A$ through $1110_R$, R being an integer). For example the first feature vector 1110 may include a genre attribute $1110_A$ and a subgenre attribute $1110_B$ that can be employed to facilitate characterizing a song. Similarly, a second feature vector 1120 may include one or more feature attributes (e.g., attributes $1120_A$ through $1120_S$, S being an integer). For example the second feature vector 1120 may include a genre attribute $1120_A$ and a subgenre attribute $1120_B$ that can be employed to facilitate characterizing a song. The feature vectors may be compared attribute by attribute to produce a difference vector 1130 that contains a binary digit that codes information concerning whether the feature attributes matched. Such attribute by attribute comparison may be complicated by a situation where the feature vectors contain different attributes and/or a different number of attributes. For example, the first feature vector 1110 might contain a first number R of feature attributes while the second feature vector 1120 might contain a second number S of feature attributes. Thus, one or more bits in the difference vector 1130 may code information based on a comparison of feature attributes that do not have a one to one correspondence. By way of illustration, the first feature vector 1110 may code information concerning song length into two attributes (e.g., length of song in seconds, size of song in kilobytes) while the second feature vector 1120 may code information concerning song length into one attribute (e.g., play length). Thus, setting or clearing a bit in the difference vector 1130 may involve resolving the dissimilar feature vector attributes. More specifically, if a subset of feature vectors is missing at random, the difference vector for the missing data can be set to be "1", indicating a difference.

Figure 12:
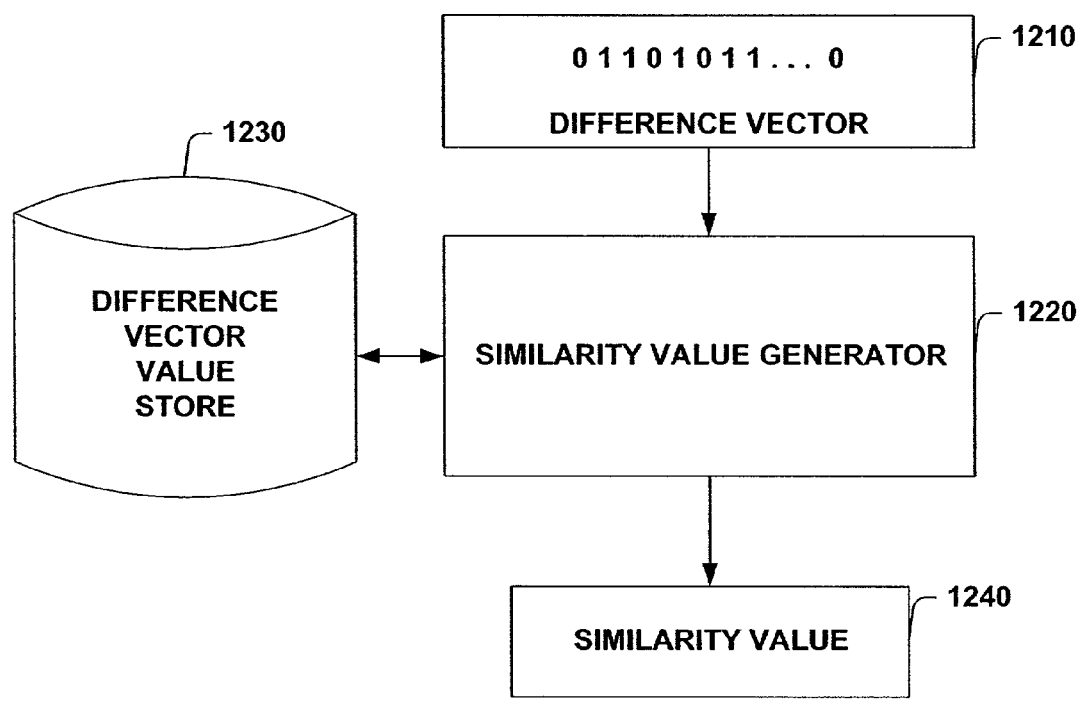
FIG. 12 is a schematic block diagram illustrating a difference vector and a difference vector value store being employed to produce a similarity value, in accordance with an aspect of the present invention.

FIG. 12 is a schematic block diagram illustrating a difference vector 1210 being employed to produce a similarity value 1240. The difference vector 1210 can be accepted as an input by a similarity value generator 1220. In one example of the present invention, the similarity value generator 1220 and the difference vector value store 1230 reside on a client machine. The similarity value generator 1220 may then retrieve a similarity value from a difference vector value store 1230. For example, for a four bit difference vector 1210, the similarity value generator 1220 may employ the four bit difference vector 1210 as an index into the difference vector value store 1230. In such a case, the difference vector value store 1230 may contain a table similar to that presented in Table II below.

TABLE II

| 0 0 0 0 | 0.00 | 0 0 0 1 | 0.01 |
| 0 0 1 0 | 0.10 | 0 0 1 1 | 0.15 |
| 0 1 0 0 | 0.20 | 0 1 0 1 | 0.25 |
| 0 1 1 0 | 0.30 | 0 1 1 1 | 0.35 |
| 1 0 0 0 | 0.40 | 1 0 0 1 | 0.45 |
| 1 0 1 0 | 0.46 | 1 0 1 1 | 0.50 |
| 1 1 0 0 | 0.60 | 1 1 0 1 | 0.70 |
| 1 1 1 0 | 0.80 | 1 1 1 1 | 0.99 |

Table II may have been generated by hand or it may have been generated through machine learning techniques applied to analyze testing data associated with feature vector comparison. Furthermore, Table II may not be a static entity. For example, the present invention may include a user interface that includes a button that allows a user to inform the list generator that a first song (e.g., Disco Duck) is never to be played in association with a second song (e.g., Stairway to Heaven) while a third song (e.g., Misty Mountain Hop) is always to be played in association with the second song. Thus, the present invention facilitates manipulating the production of a difference vector so that when Disco Duck is compared to Stairway to Heaven, a difference vector that will yield the lowest possible similarity score is produced while when Misty Mountain Hop is compared to Stairway to Heaven a difference vector that will yield the highest possible similarity score is produced. In this way the present invention is adaptable to user generated overrides of computed song similarities.

Figure 13:
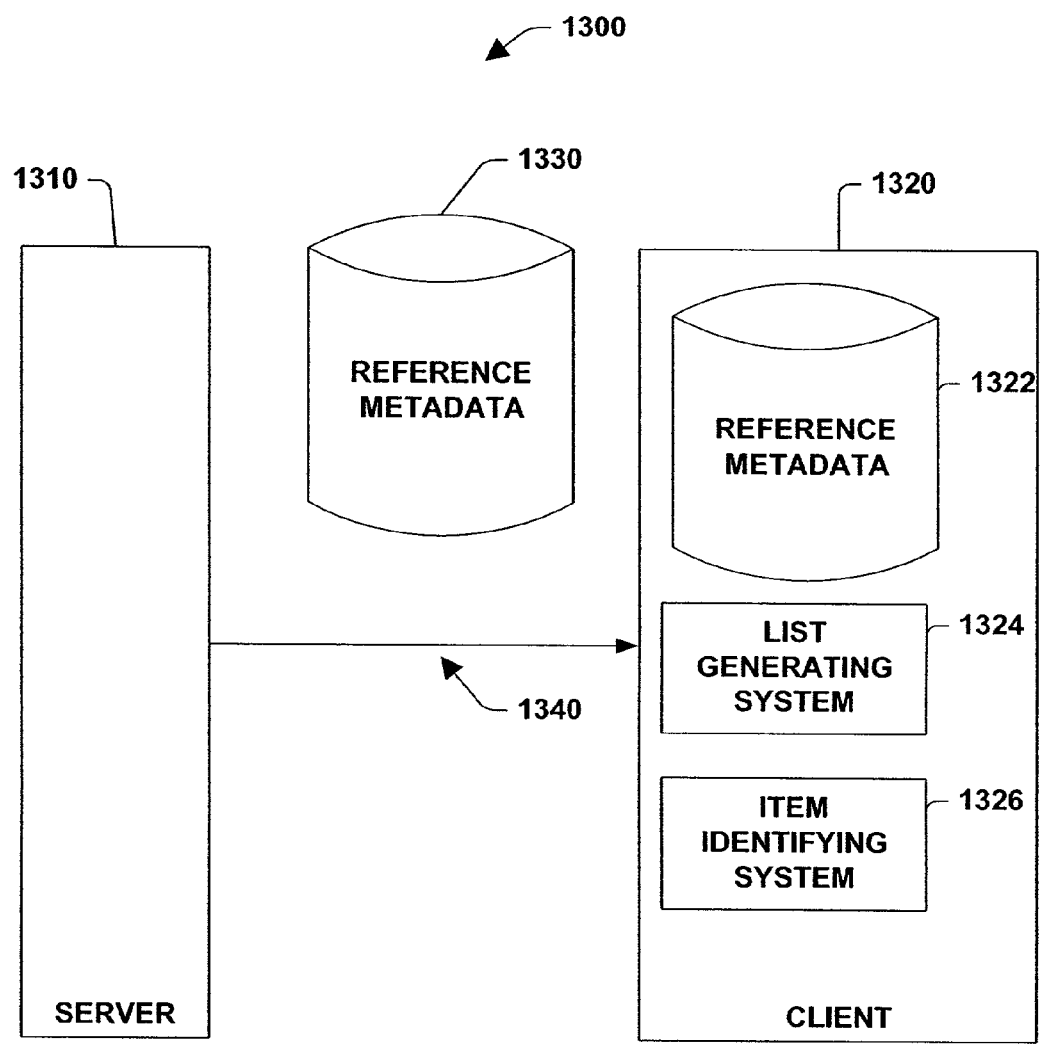
FIG. 13 illustrates a client server system where reference metadata is sent from a server to a client, in accordance with an aspect of the present invention.
Figure 14:
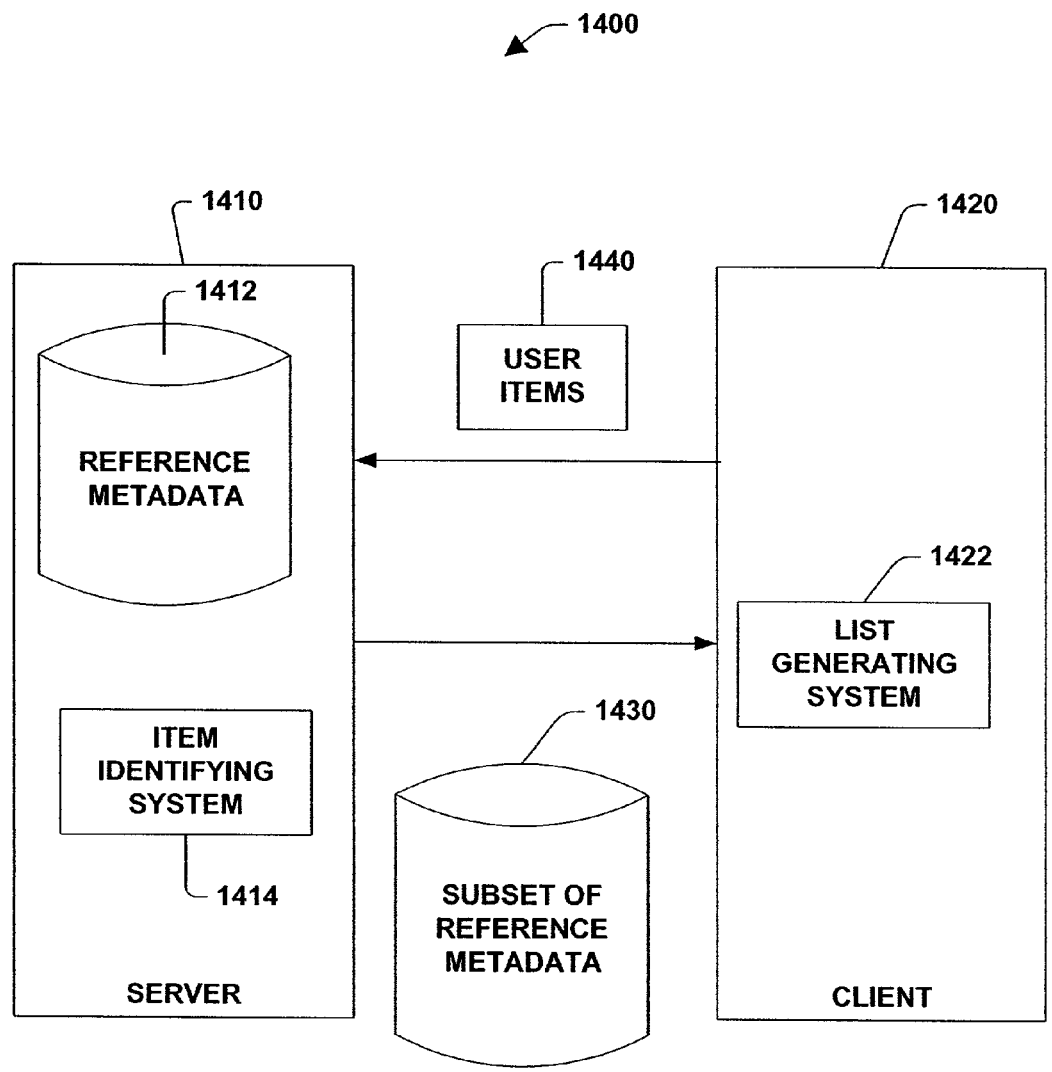
FIG. 14 illustrates a client server system where reference metadata resides on a server and a subset of the reference metadata is sent from the server to a client in response to a user item being sent to the server, in accordance with an aspect of the present invention.
Figure 15:
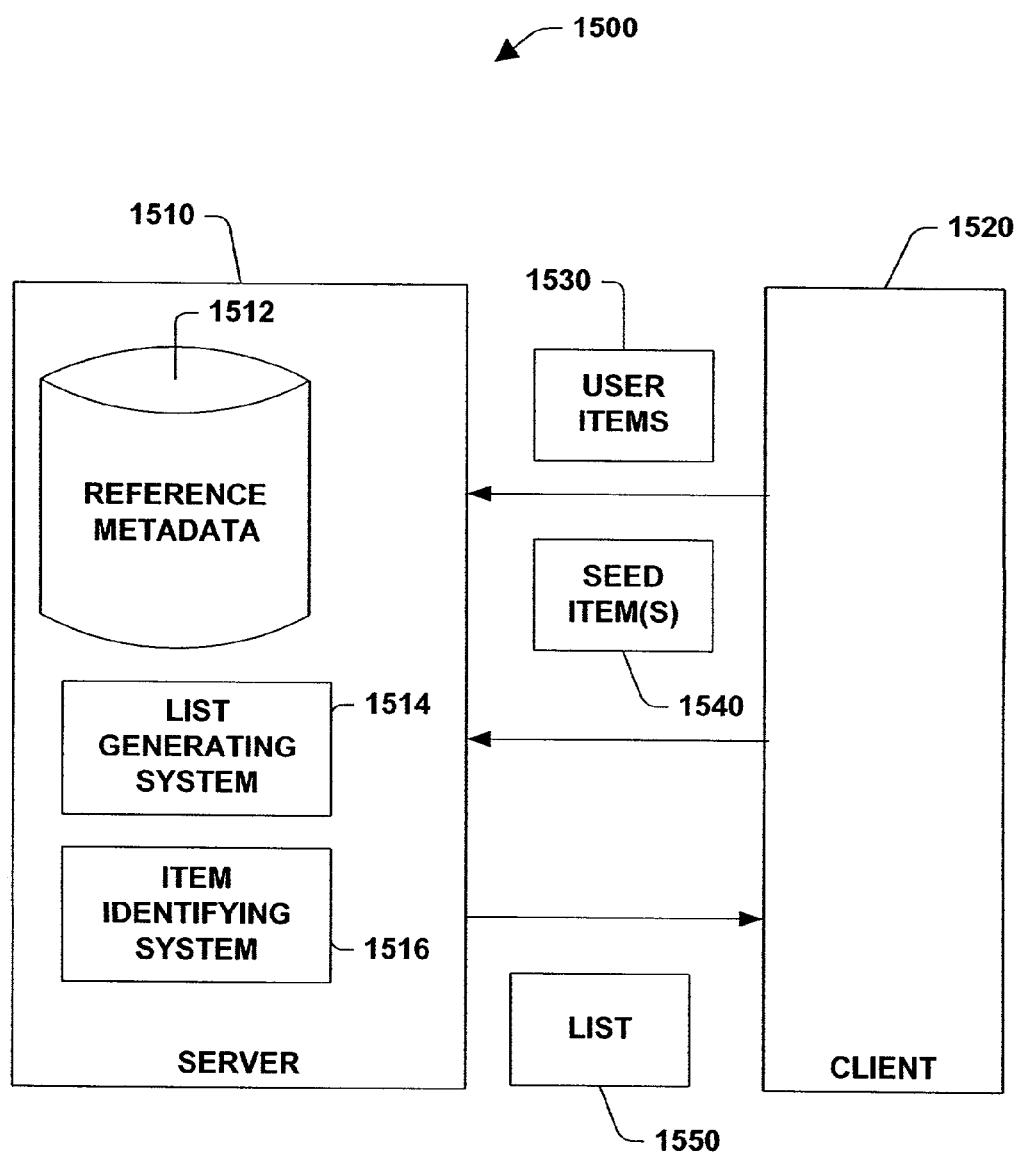
FIG. 15 illustrates a client server system where user items and seed items are sent to a server and the server sends a list back to the client in response to the user items and the seed item, in accordance with an aspect of the present invention.

FIGS. 13, 14 and 15 illustrate three different client/server configurations that may be employed with the present invention. It is to be appreciated that other configurations may be employed in accordance with the present invention. Note that in each of FIGS. 13, 14 and 15, there is an item identifying system, a list generating system and a reference metadata data store, which cooperate to facilitate generating lists of user items, where metadata associated with the user items is stored in the reference metadata data store.

FIG. 13 illustrates a client-server system 1300 where reference metadata 1330 is transmitted from a server 1310 to a client 1320. Transmitting the reference metadata 1330 to the client 1320 facilitates list processing (e.g., identifying computations, similarity computations) on the client 1320, which can reduce the amount of processing performed on the server 1310, providing advantages over conventional server based systems. For example, in a conventional server-based system, if one hundred thousand users substantially simultaneously request a list, response times may not be acceptable since the processing may proceed serially at the server 1310. However, by employing the present invention, if the one hundred thousand users had previously received the descriptive metadata 1330, then the response times may be acceptable because the processing may proceed substantially in parallel at the client machines associated with the one hundred thousand users.

In one example of the present invention, the reference metadata 1330 can include substantially all the reference metadata available on the server 1310. By transmitting substantially all the reference metadata available on the server 1310 to the client 1320, the number of communications between the client 1320 and the server 1310 may be reduced. By scheduling the transmission of the reference metadata 1330 to the client 1320 at a time of low network traffic, network congestion problems and delays associated with conventional systems can be mitigated. Furthermore, by transmitting substantially all the reference metadata 1330 to the client 1320, processing performed at the server 1310 is reduced, mitigating server congestion problems associated with conventional systems. Further still, by transmitting substantially all the reference metadata 1330 to the client 1320, the client 1320 is not required to reveal information to the server 1310 that the client may consider private (e.g., songs owned by the user). Thus, privacy problems associated with conventional systems are mitigated. But if the user so chooses, the user may transmit information from the client 1320 to the server 1310 identifying items about which the client 1320 would like to receive reference metadata (as illustrated in FIG. 14). Thus, the amount of reference metadata 1330 transmitted from the server 1310 to the client 1320 may be reduced, further mitigating congestion problems associated with conventional systems.

With substantially all of the reference metadata 1330 available on the client as the reference metadata 1322, a client-side item identifying system 1326 can be employed to generate as-added metadata associated with a new user item that a user desires to add to the user item library 130. Similarly, with substantially all of the reference metadata 1330 available on the client as the reference metadata 1322, a client-side list generating system 1324 can be employed to generate a list of items related to a seed item provided to the client.

FIG. 14 illustrates another client-server system 1400 where a server 1410 transmits a subset 1430 of reference metadata 1412 stored on the server 1410 to a client 1420. The subset 1430 may be related to one or more user items 1440 about which the client 1420 informs the server 1410. The user items 1440 may be processed by an item identifying system 1414 that resides on the server 1410 and which reconciles identifying information associated with the user items 1440 to a schema employed to identify, store and/or retrieve information stored in the reference metadata 1412. The subset of reference metadata 1430 can thus be employed by a list generating system 1422 on the client 1420 to produce a list of user items related to a seed item. The client server configuration in FIG. 14 facilitates server-based data mining.

FIG. 15 illustrates yet another client server system 1500 where the reference metadata 1512, the item identifying system 1516 and the list generating system 1514 all reside on a server 1510. In this configuration, the client 1520 sends information concerning one or more user items 1530 to the server 1510. The information concerning the user items 1530 is then processed by the item identifying system 1516 to produce unique identifiers that can be employed, for example, to locate user items and/or metadata associated with user items. When the client 1520 sends seed item(s) 1540, and/or information concerning seed item(s) 1540 to the server 1510, the server 1510 can run the list generating system 1514 at the server and return a list 1550 of items related to the seed item 1540 to the client 1520. The client server configuration in FIG. 15 minimizes the amount of processing required on the client 1520.

Figure 16:
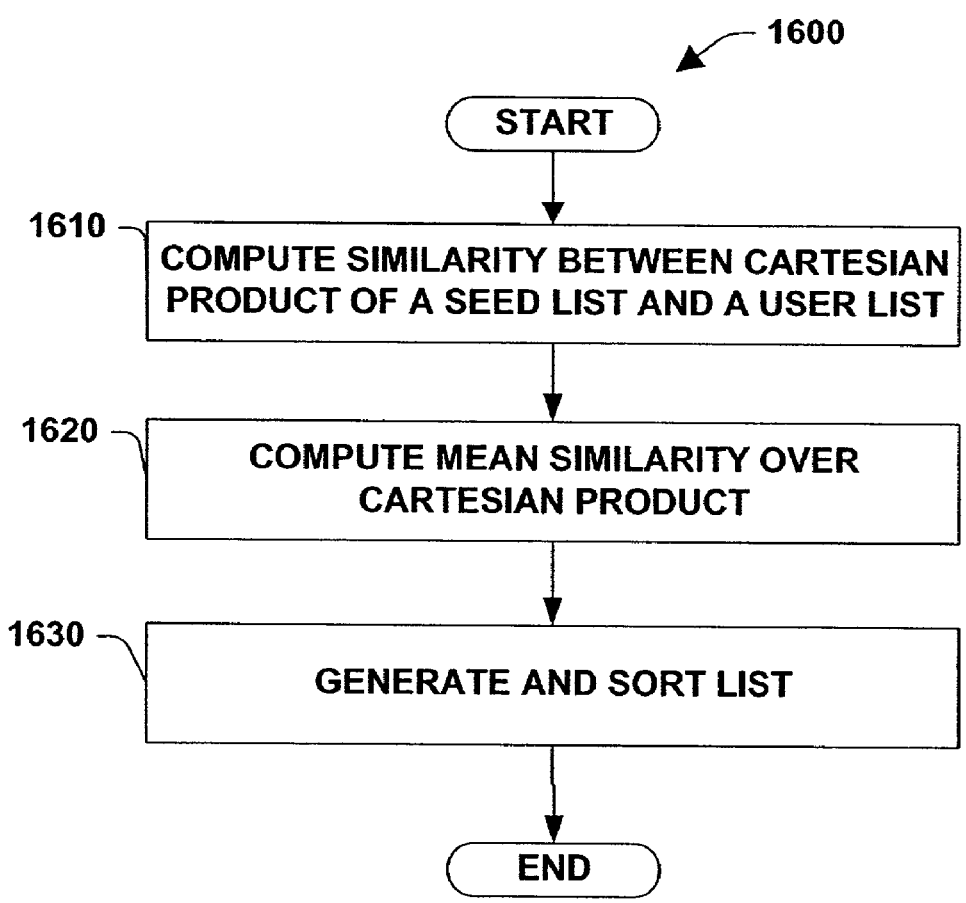
FIG. 16 is a flowchart illustrating a method associated with generating a final list, in accordance with an aspect of the present invention.

FIG. 16 is a flowchart illustrating a method 1600 for generating a final list. The following segment of pseudocode can be employed to implement the method illustrated in the flowchart associated with generating a final list via generating similarity values. At 1610, the similarity between the Cartesian product of a seed list and a user list is computed. At 1620, the mean similarity over that Cartesian product is computed. At 1630, the similarity list is generated and sorted.

```
If seed song has track id then
    Seed list = seed song
Else if seed song has artist id then
    Seed list = all user songs with same artist id
Else
    Final list = all user songs with same artist name as seed song
    Return final list
Endif
For each user song with track or artist id
    If user song has track id then
        User list = user song
    Else if user song has artist id then
        Check cache for similarity of seed to artist id
        If similarity value is in cache
            Add user song and similarity to final list
            Go to next user song
        End if
        User list = all user songs with same artist id
    End if
    Compute limits to similarity computation
    Compute similarity over all possible pairs of songs on seed list and
        user list, subject to limits
    similarity value = mean value over pairs
    if use song has no track id
        store similarity in cache
    end if
    add user song and similarity to final list
End for
Sort final list by decreasing similarity
Return final list
```

In the case where the seed song has a known track identifier, then the seed list consists of the seed song. Otherwise, if the seed song has a known artist identifier, then the seed list consists of user items whose artist identifier matches the seed song artist identifier. Otherwise, if the seed song is unknown, the final similarity list will include those user items whose artist name matches the seed song artist name. If there is more than one seed song, the seed list can be the concatenation of the seed list for all of the individual songs that have known artist or track identifiers. A user list is computed analogously for user songs that contain a track identifier or artist identifier. If the user song has a track identifier, then the user list is the user song. Otherwise, the user list is user songs whose artist identifier matches the artist identifier of the user song under consideration. For efficiency concerns, in one example of the present invention, limits may be placed on the Cartesian product between the seed list and the user list. If one of the two lists contains only a single song, iteration over the other list is limited to a pre-determined, configurable threshold (e.g., to 200 items). If both lists contain more than one song, then iteration over both lists is similarly limited to a pre-determined, configurable threshold (e.g., to 30 items). For further efficiency concerns, in one example of the present invention, when a user song does not have a track identifier, the similarity between the seed song(s) and the user song is cached, so that if another user song has the same artist identifier but a missing track identifier, then the cached value may be retrieved and employed.

Figure 17:
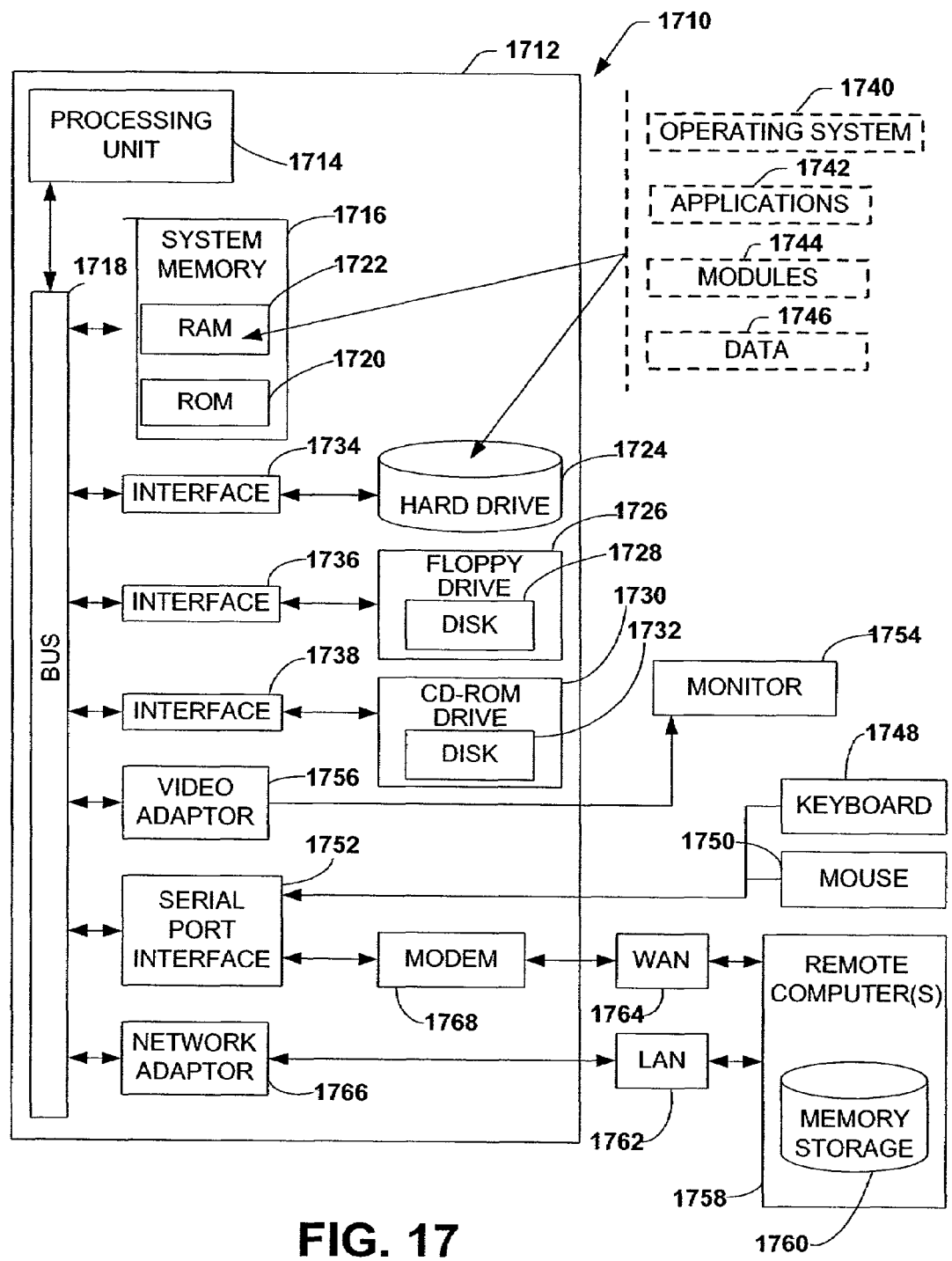
FIG. 17 is a schematic block diagram of an exemplary operating environment for a system configured in accordance with the present invention.

In order to provide additional context for various aspects of the present invention, FIG. 17 and the following discussion are intended to provide a brief, general description of one possible suitable computing environment 1710 in which the various aspects of the present invention may be implemented. It is to be appreciated that the computing environment 1710 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 17 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 17, an exemplary environment 1710 for implementing various aspects of the invention includes a computer 1712, including a processing unit 1714, a system memory 1716, and a system bus 1718 that couples various system components including the system memory to the processing unit 1714. The processing unit 1714 may be any of various commercially available processors. Dual microprocessors and other multi-processor architectures also can be used as the processing unit 1714.

The system bus 1718 may be any of several types of bus structure including a memory bus or memory controller, a peripheral bus, and a local bus using any of a variety of commercially available bus architectures. The computer memory 1716 includes read only memory (ROM) 1720 and random access memory (RAM) 1722. A basic input/output system (BIOS), containing the basic routines that help to transfer information between elements within the computer 1712, such as during start-up, is stored in ROM 1720.

The computer 1712 may further include a hard disk drive 1724, a magnetic disk drive 1726, e.g., to read from or write to a removable disk 1728, and an optical disk drive 1730, e.g., for reading a CD-ROM disk 1732 or to read from or write to other optical media. The hard disk drive 1724, magnetic disk drive 1726, and optical disk drive 1730 are connected to the system bus 1718 by a hard disk drive interface 1734, a magnetic disk drive interface 1736, and an optical drive interface 1738, respectively. The computer 1712 typically includes at least some form of computer readable media. Computer readable media can be any available media that can be accessed by the computer 1712. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1712. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1722, including an operating system 1740, one or more application programs 1742, other program modules 1744, and program non-interrupt data 1746. The operating system 1740 in the computer 1712 can be any of a number of commercially available operating systems.

A user may enter commands and information into the computer 1712 through a keyboard 1748 and a pointing device, such as a mouse 1750. Other input devices (not shown) may include a microphone, an IR remote control, a joystick, a game pad, a satellite dish, a scanner, or the like. These and other input devices are often connected to the processing unit 1714 through a serial port interface 1752 that is coupled to the system bus 1718, but may be connected by other interfaces, such as a parallel port, a game port, a universal serial bus ("USB"), an IR interface, etc. A monitor 1754, or other type of display device, is also connected to the system bus 1718 via an interface, such as a video adapter 1756. In addition to the monitor, a computer typically includes other peripheral output devices (not shown), such as speakers, printers etc.

The computer 1712 may operate in a networked environment using logical and/or physical connections to one or more remote computers, such as a remote computer(s) 1758. The remote computer(s) 1758 may be a workstation, a server computer, a router, a personal computer, microprocessor based entertainment appliance, a peer device or other common network node, and typically includes many or all of the elements described relative to the computer 1712, although, for purposes of brevity, only a memory storage device 1760 is illustrated. The logical connections depicted include a local area network (LAN) 1762 and a wide area network (WAN) 1764. Such networking environments are commonplace in offices, enterprise-wide computer networks, intranets and the Internet.

When used in a LAN networking environment, the computer 1712 is connected to the local network 1762 through a network interface or adapter 1766. When used in a WAN networking environment, the computer 1712 typically includes a modem 1768, or is connected to a communications server on the LAN, or has other means for establishing communications over the WAN 1764, such as the Internet. The modem 1768, which may be internal or external, is connected to the system bus 1718 via the serial port interface 1752. In a networked environment, program modules depicted relative to the computer 1712, or portions thereof, may be stored in the remote memory storage device 1760. It will be appreciated that the network connections shown are exemplary and other means of establishing a communications link between the computers may be used.

Figure 18:
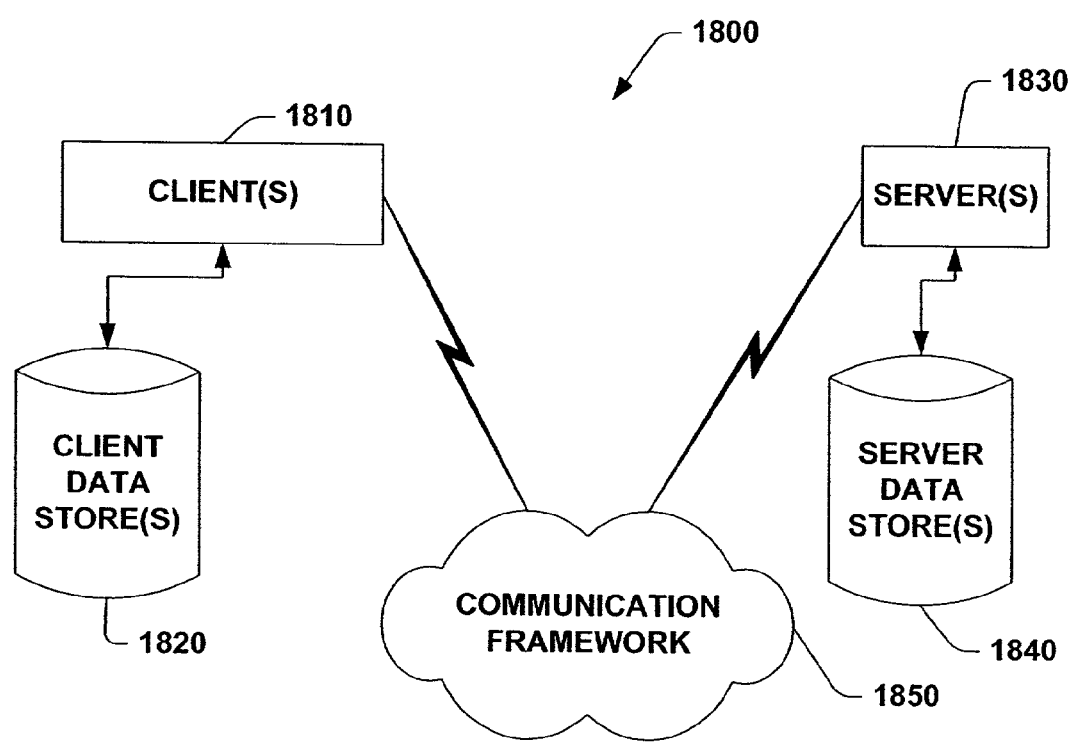
FIG. 18 is a schematic block diagram of an exemplary computing environment for a method performing in accordance with the present invention.

FIG. 18 is a schematic block diagram of a sample computing environment 1800 with which the present invention may interact. The system 1800 includes one or more clients 1810. The clients 1810 may be hardware and/or software (e.g., threads, processes, computing devices). The system 1800 also includes one or more servers 1830. The servers 1830 may also be hardware and/or software (e.g., threads, processes, computing devices). While FIG. 18 illustrates a client/server configuration, it is to be appreciated that other configurations (e.g., stand alone, widely distributed, peer-to-peer, etc.) may be employed in accordance with the present invention.

The system 1800 includes a communication framework 1850 that can be employed to facilitate communications between the clients 1810 and the servers 1830. The clients 1810 are operably connected to one or more client data stores 1815 that can be employed to store information local to the clients 1810. For example, the client data stores 1815 may store user songs, user song identifying data and/or user song descriptive metadata. Similarly, the servers 1830 are operably connected to one or more server data stores 1840 that can be employed to store information local to the servers 1830. For example, the server data stores 1840 may store songs, song identifying data and/or song descriptive metadata. In one example of the present invention, descriptive metadata initially resides on one or more server data stores 1840 and is transmitted to the client data stores 1820 to facilitate client side list generation processing.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates generating one or more lists, the system comprising:
   a user data store that stores user items;
   an identifying system that associates descriptive metadata with user items; and
   a list generation system to receive at least one seed item generated from descriptive metadata associated with a selected user item, the list generation system analyzing the at least one seed item at least in part by comparing the at least one seed item to one or more candidate items generated from the descriptive metadata associated with the user items to determine a degree of similarity between the at least one seed item and the one or more candidate items, wherein the analysis is facilitated by a similarity subsystem designed at least in part by a machine learning technique that learns from descriptive metadata associated with a training set of items, the list generation system outputting one or more lists corresponding to a subset of user items that are similar to the selected user item.

2. The system of claim 1 where the user data store resides on a client computing system.

3. The system of claim 2 where the list generation system resides on the client computing system.

4. The system of claim 1 where the one or more list items are songs.

5. The system of claim 4 where the songs are identifiable by at least one of an artist name, an album name and a track name.

6. The system of claim 5 where the descriptive metadata comprises information concerning at least one of a genre, a subgenre, a style, a mood, a vocal coding, a rhythm type and a rhythm description.

7. The system of claim 6 where the list corresponding to the subset of user items is a song playlist.

8. The system of claim 1 where the list items comprise at least one of movies, documents, books, music videos and sound recordings.

9. The system of claim 1, wherein the identifying system associates descriptive metadata with user items by performing inexact matching between identifying metadata associated with a user item to be added to a media library and identifying metadata associated with items in a reference metadata database.

10. A computer implemented method for generating one or more lists, the method comprising:
   providing a plurality of metadata attributes relating to the content of a media object;
   generating a seed feature vector from the plurality of metadata attributes;
   providing at least one candidate feature vector, the at least one candidate feature vector generated from metadata relating to the content of a candidate object;
   comparing the seed feature vector to the at least one candidate feature vector according to a similarity function, wherein the similarity function is determined at least in part by a machine leaning algorithm employing metadata attributes of a test set of media objects and wherein the similarity function returns an output indicative of the degree of similarity between the seed feature vector and the at least one candidate feature vector; and
   generating a list of candidate items based on the output of the similarity function.

11. The method of claim 10, wherein comparing the seed feature vector to the candidate feature vector comprises producing a difference vector.

12. The method of claim 10, wherein the seed feature vector has at least 7 subjective metadata attributes.

13. The method of claim 11, wherein the at least 7 subjective metadata attributes comprise a genre attribute, a subgenre attribute, a style attribute, a mood attribute, a vocal coding attribute, a rhythm type attribute and a rhythm description attribute.

14. The method of claim 10, wherein the machine learning algorithm utilizes a sparse quadratic program.

15. Computer-executable instructions for implementing the method of claim 10 stored on computer-readable storage media.

16. A data packet stored on a storage medium, the data packet comprising computer executable instructions for performing the method of claim 10.

* * * * *